(12) United States Patent
Buckmiller et al.

(10) Patent No.: US 6,655,707 B2
(45) Date of Patent: Dec. 2, 2003

(54) NET SHAPE FILAMENT WINDING MANUFACTURING PROCESS, ARTICLES MADE THEREFROM AND COMPOSITE BICYCLE FORK AND OTHER COMPONENTS

(75) Inventors: Daniel K. Buckmiller, Salt Lake City, UT (US); Douglas G. Olsen, Salt Lake City, UT (US); Randall J. Philpot, Salt Lake City, UT (US)

(73) Assignee: Advanced Composites, Inc., Salt Lake City, UT (US)

( * ) Notice: Subject to any disclaimer, the term of this patent is extended or adjusted under 35 U.S.C. 154(b) by 0 days.

(21) Appl. No.: 09/919,774

(22) Filed: Jul. 31, 2001

(65) Prior Publication Data

US 2002/0063410 A1 May 30, 2002

Related U.S. Application Data

(63) Continuation-in-part of application No. 08/794,044, filed on Feb. 3, 1997, now Pat. No. 6,267,399, which is a continuation-in-part of application No. 08/294,421, filed on Aug. 22, 1994, now Pat. No. 5,609,349.

(51) Int. Cl.[7] .......................... B62K 19/16; B62K 21/04
(52) U.S. Cl. ..................................... 280/279; 280/288.3
(58) Field of Search ................................ 280/279, 280, 280/274, 281.1, 288.4, 278, 287, 276, 288.3

(56) References Cited

U.S. PATENT DOCUMENTS

| | | |
|---|---|---|
| 624,182 A | 5/1899 | Cook |
| 1,511,350 A | 10/1924 | Meiselbach |
| 2,114,733 A | 4/1938 | Anderson |
| 2,153,249 A | 4/1939 | Henry |
| 2,428,148 A * | 9/1947 | Dawson |
| 2,487,661 A | 11/1949 | McCauley |
| 2,550,941 A | 5/1951 | Schuricht |
| 3,039,661 A | 6/1962 | Wentz et al. |
| 3,147,975 A | 9/1964 | Gruss et al. |
| 3,258,511 A | 6/1966 | McGregor |
| 3,478,134 A | 11/1969 | Gruss et al. |
| 3,533,643 A | 10/1970 | Yamada |
| 3,619,436 A | 11/1971 | Gruss et al. |
| 3,833,242 A | 9/1974 | Thompson, Jr. |
| 4,008,903 A | 2/1977 | Ramond |
| 4,015,854 A | 4/1977 | Ramond |
| 4,067,589 A | 1/1978 | Hon |
| 4,245,522 A | 1/1981 | Robinson |

(List continued on next page.)

FOREIGN PATENT DOCUMENTS

| | | | | |
|---|---|---|---|---|
| CH | 262148 | * | 6/1949 | ................. 280/280 |
| DE | 3804342 | | 8/1989 | |
| DK | 67921 | * | 10/1946 | ................. 280/280 |
| EP | 0230839 | | 4/1990 | |
| EP | 0127553 | | 12/1992 | |
| FR | 48546 | | 3/1938 | |
| FR | 895046 | | 5/1943 | |
| FR | 983621 | * | 6/1951 | ................. 280/280 |
| FR | 2684062 | | 5/1993 | |
| GB | 19193 | | 10/1895 | |
| GB | 20738 | | 10/1901 | |
| GB | 291979 | * | 6/1928 | ................. 280/279 |
| GB | 2138755 | | 3/1983 | |
| IT | 448310 | | 5/1949 | |
| JP | 63-082891 | | 4/1988 | |

*Primary Examiner*—Anne Marie Boehler
(74) *Attorney, Agent, or Firm*—Townsend and Townsend and Crew LLP

(57) ABSTRACT

A net shape filament winding manufacturing process and resulting products are disclosed. The manufacture of bicycle frame and their components from filament wound components which have been cut from a section of filament wound stock is disclosed. Also disclosed is a bicycle frame and its manufacturing process and a composite bicycle fork and components thereof.

12 Claims, 20 Drawing Sheets

U.S. PATENT DOCUMENTS

| | | | |
|---|---|---|---|
| 4,298,556 A | 11/1981 | Rutsch et al. | |
| 4,322,087 A | 3/1982 | Addicks | |
| 4,351,786 A | 9/1982 | Mueller | |
| 4,548,422 A | 10/1985 | Michel et al. | |
| 4,550,927 A | 11/1985 | Resele | |
| 4,565,383 A | 1/1986 | Isaac | |
| 4,596,398 A | 6/1986 | Grossi | |
| 4,614,627 A | 9/1986 | Curtis et al. | |
| 4,657,795 A | 4/1987 | Foret | |
| 4,714,575 A | 12/1987 | Preston | |
| 4,828,285 A | 5/1989 | Foret et al. | |
| 4,901,209 A | 2/1990 | Nitz | |
| 4,909,537 A * | 3/1990 | Tratner | 280/278 |
| 4,923,203 A | 5/1990 | Trimble et al. | |
| 4,993,735 A * | 2/1991 | Chen | 280/280 |
| 5,011,172 A | 4/1991 | Bellanca et al. | |
| 5,016,895 A | 5/1991 | Hollingsworth et al. | |
| 5,039,470 A | 8/1991 | Bezin et al. | |
| 5,042,968 A | 8/1991 | Fecto | |
| 5,060,961 A | 10/1991 | Bontrager | |
| 5,078,417 A | 1/1992 | Mouritsen | |
| 5,080,385 A | 1/1992 | Duplessis | |
| 5,181,732 A | 1/1993 | Bezin et al. | |
| 5,213,322 A | 5/1993 | Matsuo et al. | |
| 5,215,322 A | 6/1993 | Enders | |
| 5,236,212 A | 8/1993 | Duehring et al. | |
| 5,269,549 A * | 12/1993 | Wilson et al. | 280/276 |
| 5,271,784 A * | 12/1993 | Chen et al. | 280/288.3 |
| 5,318,742 A | 6/1994 | You | |
| 5,368,804 A | 11/1994 | Hwang et al. | |
| 5,445,400 A | 8/1995 | Martin et al. | |
| 5,580,075 A | 12/1996 | Turner et al. | |
| 5,609,349 A | 3/1997 | Buckmiller et al. | |
| 5,692,764 A | 12/1997 | Klein et al. | |
| 5,803,476 A | 9/1998 | Olson et al. | |
| 5,944,932 A | 8/1999 | Klein et al. | |
| 6,267,399 B1 | 7/2001 | Buckmiller et al. | |
| 6,270,104 B1 | 8/2001 | Nelson et al. | |

* cited by examiner

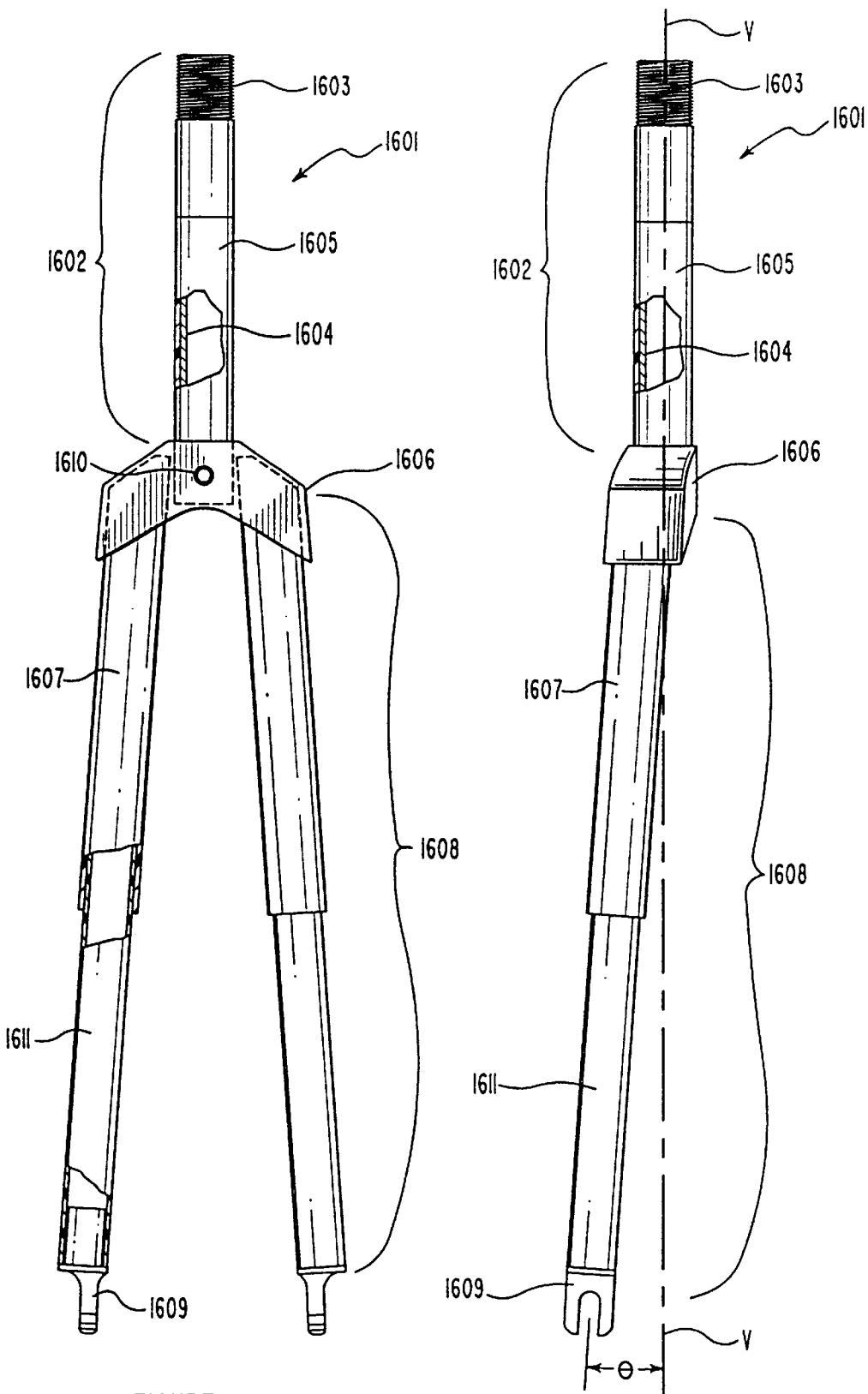

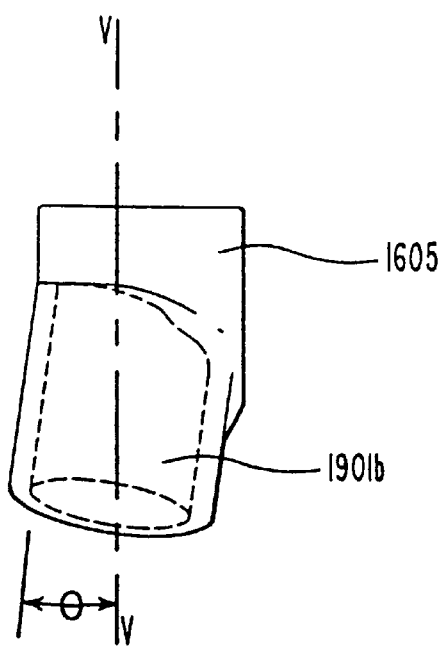
FIGURE 21
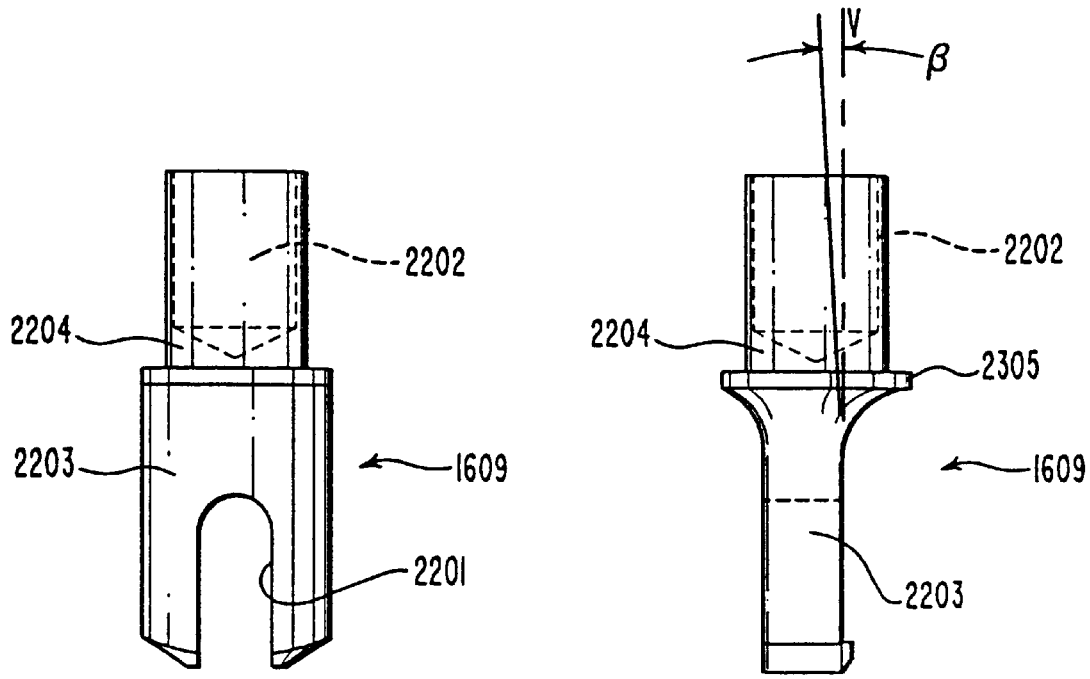
FIGURE 22a
FIGURE 22b

NET SHAPE FILAMENT WINDING MANUFACTURING PROCESS, ARTICLES MADE THEREFROM AND COMPOSITE BICYCLE FORK AND OTHER COMPONENTS

CROSS REFERENCE TO RELATED APPLICATIONS

This patent application is a continuation-in-part of U.S. patent application Ser. No. 08/794,044, filed Feb. 3, 1997, now U.S. Pat. No. 6,267,399, which is a continuation-in-part of U.S. patent application Ser. No. 08/294,421, filed Aug. 22, 1994, now U.S. Pat. No. 5,609,349; the disclosures of which are incorporated by reference herein.

BACKGROUND OF INVENTION

A variety of bicycle frames and frame components have been described, including those described in, for example: U.S. Pat. No. 4,923,203 in the name of Trimble et al.; U.S. Pat. No. 5,213,322 in the name of Enders: U.S. Pat. No. 4,067,589 in the name of Hon; U.S. Pat. No. 5,011,172 in the name of Bellanca et al.; U.S. Pat. No. 4,550,927 in the name of Resele; U.S. Pat. No. 4,548,422 in the name of Michel et al.; U.S. Pat. No. 3,533,643 in the name of Yamada; U.S. Pat. Nos. 5,016,895 and 4,923,203 in the name of Hollingsworth; and U.S. Pat. No. 4,565,383 in the name of Isaac; each of which is hereby incorporated by reference in its entirety for the material disclosed therein. International patents containing pertinent disclosure include Italian Patent No. 448,310 in the name of F. Janecek; French Patent No. 895,046 in the name of Delorge et al.; and U.K. Patent No. 19,193 in the name of Otto Schonauer; each of which is hereby incorporated by reference in its entirety for the material disclosed therein.

These patents generally describe traditional bicycle frames could be constructed from tubing that was round in cross section. Such traditional round tubing frames typically consisted of two main triangle shapes. The larger of these two triangle shapes, referred to herein as the front triangle, consisted of a seat tube, a top tube and a down tube which were welded or adhesively joined to appropriate lugs (such as a head lug and bottom bracket lug). The bicycle frame could be constructed by laying up composite pre-preg into a female mold to produce a monocoque frame. Two smaller triangle shapes were employed, referred to herein as the rear triangles. Each consisted of a seat stay, a chain stay and a seat tube which was shared with the front triangle. The rear triangle assembly, when viewed from the side, appeared to be a single triangle, but when viewed from the top or rear, actually was two spaced apart rear triangles each terminating at its rear in an axle drop-out for mounting of a rear bicycle wheel.

Filament wound tubing has been constructed and articles made therefrom. If it was desired to manufacture a bicycle frame using filament wound tubing, then typically individual tubing members (which were round in cross section) would be constructed and then joined to aluminum cast lugs and more recently to composite lugs. Composite tubing used in conventional tube and lug frames has largely been produced using carbon/epoxy or graphite/epoxy pre-preg and roll wrapping process. Alternatively, a hollow bicycle frame could be made from square tubing using a lay-up, braiding process. The reader's attention is directed to U.S. Pat. Nos. 5,215,322 and 4,923,203 for general disclosure. It was also known that bicycle frames or portions thereof could be made by injection molding. For general reference the reader is directed to U.S. Pat. Nos. 5,011,172 and 4,067,589.

There is a need, however, for bicycle frames and other components manufactured by a filament winding process so that the resulting product is light weight, strong, attractive, and cost efficient to manufacture. Similarly, there is a need for composite bicycle forks that are light weight, strong, attractive, and cost efficient to manufacture. The present invention meets these and other needs.

SUMMARY OF INVENTION

The present invention relates to net shape filament winding manufacturing processes and products that can be made using such processes. Products that can be made by the invented processes include, for example, bicycle frames, bicycle frame components, and components of other vehicles. In one aspect, a frame for a wheeled vehicle is provided. The frame includes a front structural element having a top beam, a down beam and a seat beam that are connected. The frame also includes an upper rear structural element having a left seat stay beam, a right seat stay beam, and a mounting portion configured for mounting to the front structural element. The mounting portion is typically formed by a joining of the left seat stay first end and the right seat stay first end. The frame can also include a lower rear structural element including a left chain beam, a right chain beam, and a mounting portion configured for mounting to the frame. The mounting portion is formed by a joining of a left chain stay first end and a right chain stay first end. The upper rear structural element is joined to the lower rear structural element left chain stay. The upper rear structural element is typically mounted to the front structural element by a shock absorption mechanism.

The upper and lower rear structural elements can be joined at wheel drop outs.

The front structural element and/or the rear structural element can be made of a resin matrix and reinforcing fiber. The front structural element and/or the rear structural element can be a filament wound composite.

The frame can also include a head tube and a head cap that joins the head tube to the front structural element. A seat tube can be joined to the front structural element by a seat cap. A bottom bracket tube can be joined to the front structural element and/or the rear structural element.

The frame can optionally be reinforced with reinforcing side elements mounted to a side of the front structural element. A channel can be formed in any portion of the front structural element and/or the rear structural element, and a reinforcing side element installed in the channel.

In a certain embodiment, the frame includes on its left side, a left seat beam channel on the left side of the seat beam; an elongate reinforcing member installed in the left seat beam channel; a left top beam channel on the left side of the top beam; an elongate reinforcing member installed in the left top beam channel; a left down beam channel on the left side of the down beam; an elongate reinforcing member installed in the left down beam channel; a left seat stay channel on the left side of the seat stay; an elongate reinforcing member installed in the left seat stay channel; a left chain stay channel on the left side of the chain stay; and an elongate reinforcing member installed in the left chain stay channel. In the same embodiment, the frame includes on its right side, a right seat beam channel on the right side of the seat beam; an elongate reinforcing member installed in the right seat beam channel; a right top beam channel on the right side of the top beam; an elongate reinforcing member installed in the right top beam channel; a right down beam channel on the right side of the down beam; an elongate reinforcing member installed in the right down beam channel; a right seat stay channel on the right side of the seat stay; an elongate reinforcing member installed in the right seat stay channel; a right chain stay channel on the right side of the chain stay; and an elongate reinforcing member installed in the right chain stay channel. The frame also can include a track configured to accept a cable. The track can be included in a channel in the frame in, for example, the upper and/or lower rear structural element.

In a certain embodiment, any structural element of the frame can include a first thickness of resin matrix and reinforcing fiber, a second thickness of structural foam, and a third thickness of resin matrix and reinforcing fiber. Any structural element also can include a channel in the structural foam with a reinforcing side element installed in the channel. A track can also be included in the channel to accept an elongate cable. The first and/or third thickness can be formed of resin matrix and reinforcing fiber, such as by filament wounding.

In other embodiments, a structural element having a top, a bottom, a first flank and a second flank is provided. The structural element includes a first thickness of resin matrix and reinforcing fiber; a second thickness of structural foam, and a third thickness of resin matrix and reinforcing fiber; the third thickness disposed between the first and second thicknesses. A reinforcing side element optionally can be installed in any flank.

In another aspect, processes for making structural elements are provided. The processes generally include selecting a mandrel of a desired shape, filament winding reinforcing fiber with a resin matrix onto the mandrel resulting in a length of uncured filament wound component stock on the mandrel, curing the length of filament wound component stock, removing the mandrel from component stock, and forming a plurality of structural elements from the component stock.

The process can also be performed by selecting a mandrel of a desired shape, filament winding a first thickness of reinforcing fiber with a resin matrix onto the mandrel, placing a thickness of structural foam onto the first filament wound thickness, filament winding a second thickness of reinforcing fiber with a resin matrix onto the mandrel resulting in a length of uncured filament wound component stock on the mandrel, the component stock having a first filament wound thickness, a second filament wound thickness, and a structural foam thickness disposed between the first and the second filament wound thicknesses. The length of filament wound component stock is cured, removed from the mandrel, and a plurality of structural elements are formed from the component stock.

Bicycle frame components can be prepared by manufacturing structural components by selecting a mandrel of a desired shape, filament winding a first filament wound thickness of reinforcing fiber with a resin matrix onto the first mandrel, placing a thickness of structural foam onto the first filament wound thickness, filament winding a second filament wound thickness of reinforcing fiber with a resin matrix onto the mandrel to form a length of uncured filament wound component stock on the mandrel. The component stock typically has a first filament wound thickness, a second filament wound thickness, and a structural foam thickness disposed between the first and the second filament wound thicknesses. The length of filament wound component stock is cured, removed from the mandrel, and formed into a plurality of structural elements. Cap elements can be prepared by selecting a mandrel of a desired shape, filament winding reinforcing fiber with a resin matrix onto the mandrel to form a length of uncured filament wound cap stock on the mandrel, curing the length of filament wound cap stock, removing the mandrel from the cap stock, and forming a plurality of structural elements from the cap stock.

In another aspect, a method for constructing a frame for a vehicle having at least two wheels is provided. The method generally includes: obtaining a three-sided front structural element; obtaining a rear structural element; obtaining a head tube, a head cap, a seat tube, a seat cap, a bottom bracket tube and a bottom bracket cap; joining the rear structural element to the front structural element; joining the head tube to the front structural element with the head cap; joining the seat tube to the front structural element with the seat cap; and joining the bottom bracket tube to the front structural element and the rear structural element with the bottom bracket cap.

In another aspect, a method is provided for constructing a frame for a vehicle having at least two wheels. The method includes filament winding a continuous front structural element that includes a top beam, a seat beam, and a down beam that are connected. A rear structural element is also filament wound, the rear structural element including a seat stay, a chain stay, and mounting protrusions. Also provided are a head tube, a head cap, a seat tube, a seat cap, a bottom bracket tube, and a bottom bracket cap. The rear structural element is joined to the front structural element. The head tube is joined to the front structural element with the head cap. The seat tube is joined to the front structural element with the seat cap. The bottom bracket tube is joined to the front structural element and the rear structural element with the bottom bracket cap.

In another aspect, a method is provided for manufacturing a bicycle fork leg element. The method generally includes selecting a mandrel of a desired shape, filament winding a thickness of reinforcing fiber with a resin matrix onto the mandrel to form a length of fork stock, curing the length of filament wound fork stock, removing the mandrel from the fork stock, and forming a plurality of fork leg elements from the fork stock. A method for manufacturing a fork leg element can include selecting a mandrel of a desired shape, filament winding a first thickness of reinforcing fiber with a resin matrix onto the mandrel, placing a thickness of structural foam onto the first filament wound thickness, filament winding a second thickness of reinforcing fiber with a resin matrix onto the mandrel, curing the length of resulting filament wound fork stock, removing the mandrel from the fork stock, and cutting a plurality of fork leg elements from the fork stock.

In another aspect, a method for manufacturing a bicycle component is provided that includes selecting a mandrel of a desired shape, filament winding a thickness of reinforcing fiber with a resin matrix onto the mandrel to form a length of wet component stock, removing the mandrel from the wet component stock, making a cut along the wet component stock, placing a portion of the component stock on a mold, causing the portion to component stock to substantially conform to the shape of the mold, curing the portion of component stock in place on the mold, and removing the portion of component stock from the mold, resulting in a molded, cured component.

In another aspect, a fork for a vehicle is provided. The fork generally includes a steer tube having an elongate tubular main steer tube section, an upper insert in the main steer tube section, a crown having an upper receptacle and one or more a lower receptacles. One or more leg members are installed into the lower receptacle(s). In certain embodiments, the steer tube can further include a reinforcing sleeve installed into the main steer tube. The main steer tube and/or the reinforcing sleeve can be filament wound components. The leg member can be, for example, a resin matrix and reinforcing fiber and can be a filament wound component. The upper portion of the insert optionally can be threaded. The lower portion of the reinforcing sleeve also can be threaded.

In certain embodiments, the leg member can be formed as a upper half leg and a lower half leg The upper half leg optionally can be more rigid than the lower half leg. In another embodiment, the leg member can include an upper leg, a mid half leg, and a lower leg. The fork leg or portions thereof can be, for example, resin matrix and reinforcing fiber, such as a filament wound component.

In another aspect, a fork for a wheeled vehicle is provided. The fork includes a steer tube, a first leg member, and a second leg member. Each leg member has a mounting protrusion that is installed into a receptacle in the steer tube. A leg member can optionally be formed as a first thickness of resin matrix and reinforcing fiber, a second thickness of resin matrix and reinforcing material, and a third thickness of structural foam disposed between the first thickness and the second thickness.

In a related aspect, another fork for a wheeled vehicle is provided. The fork includes a steer tube; a crown; and a unitary fork leg member. The unitary fork leg member has a center mounting section joining a right fork leg and a left fork leg. In a certain embodiment, the unitary fork leg member includes a first thickness of resin matrix and reinforcing fiber, a second thickness of resin matrix and reinforcing material, and third thickness of structural foam disposed between the first thickness and the second thickness.

A further understanding of the nature and advantages of the invention will become apparent by reference to the remaining portions of the specification and the drawings.

BRIEF DESCRIPTION OF THE DRAWINGS

FIG. 16 is a front view of an embodiment of an assembled bicycle fork.

FIG. 17 is a side view of an embodiment of an assembled bicycle fork.

FIG. 21 is a left side view of an embodiment of a bicycle fork crown of the invention with a left fork leg receptacle shown in phantom.

FIG. 22a is a left side view of the bicycle front wheel drop out.

FIG. 22b is a front view of the right bicycle front drop out.

DESCRIPTION OF THE SPECIFIC EMBODIMENTS

Structure of the Invented Articles

Bicycle Frame and Components Thereof

Figure 1:
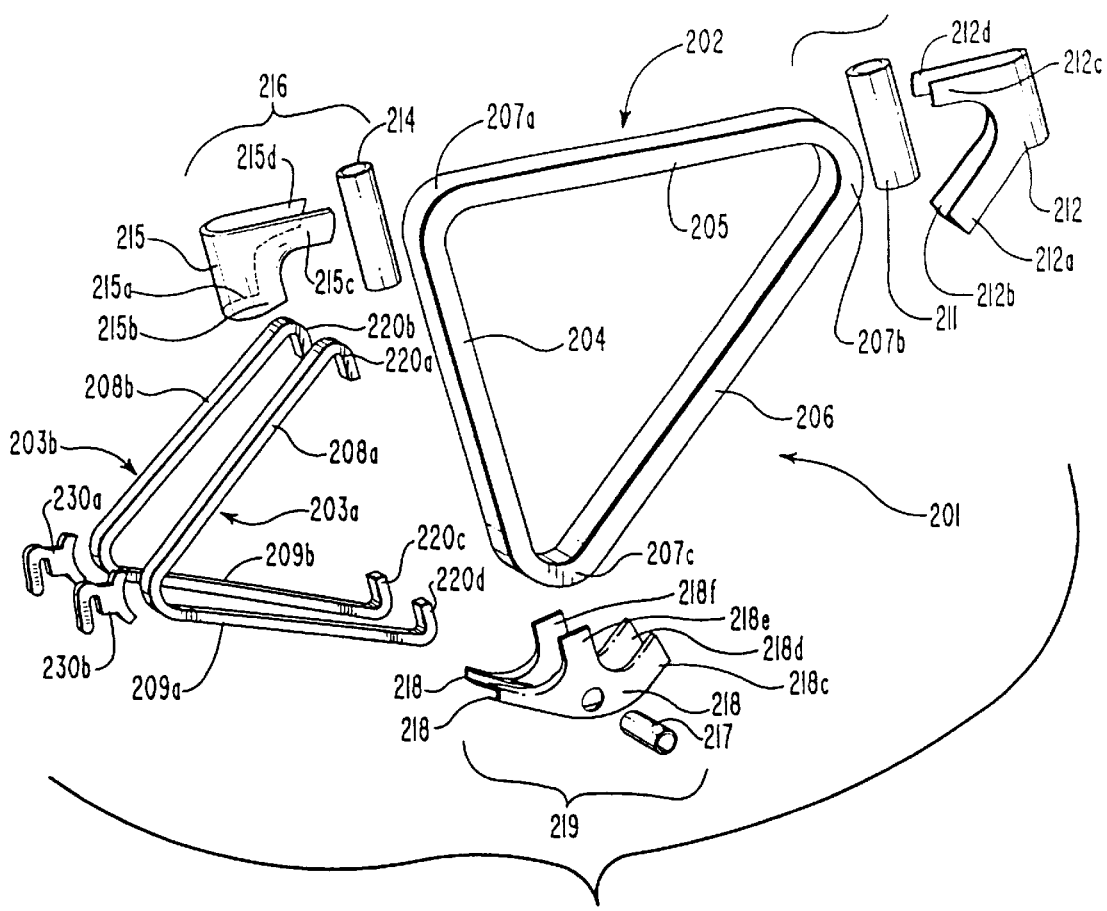
FIG. 1 depicts an exploded view of an embodiment of the bicycle frame according to the present invention.

Referring to FIG. 1, an exploded view of components used to assemble an embodiment of bicycle frame 201 are shown. The components include a front three-sided structural element 202 and two rear structural elements 203a and 203b. The front structural element 202 includes a seat beam 204, a top beam 205 and a down beam 206 arranged generally in the shape of a triangle. In one embodiment, the triangle shape of the structural element does not have sharp angular corners 207a, 207b and 207c. Rather, the corners 207a, 207b and 207c of the front structural element 202 are rounded for manufacturing convenience and for structural, performance and aesthetic reasons. In alternate embodiments, the corners of the structural element can be rounded or not, as desired. The front and rear structural elements do not necessarily need to be three-sided, and in alternative embodiments they could be round, elliptical, pentagonal, rectangular, octagonal, oval, multi-sided or otherwise, as desired. In certain embodiments, the rear structural elements can be manufactured as three-sided structural elements, from which a section of material has been removed. The various structural elements 202, 203a and 203b are typically the members that provide the bicycle frame 201 with its primary structural strength.

Each rear structural element 203a and 203b typically includes a seat stay 208a or 208b, a chain stay 209a or 209b, and two protrusions 220a and 220b, or 220c and 220d, which are used to bond or join the rear structural elements 203a and 203b to the front structural element 202. In certain embodiments, the rear structural elements 203a and 203b do not include a seat beam joined to the seat beam 204 of the front structural element 202 to save weight. In alternative embodiments, the rear structural elements 203a and 203b can include a seat beam joined to the seat beam 204 of the front structural element 202. In certain embodiments, for assembly, the rear seat beam mounting protrusions 220a, 220b, 220c and 220d are cut or routed at an angle so that when they are mounted on the seat beam 204, each rear structural element 203a and 203b angles slightly away from the other so that a space is provided between them for mounting of a rear bicycle wheel.

Also depicted in the FIG. 1 are additional elements including a head tube 211 and head tube cap 212 which together comprise a head set or lug 213. Similarly, a seat tube 214 and seat tube cap 215 comprise a seat lug 216. A bottom bracket tube or shell 217 and bottom bracket cap 218 comprise a bottom bracket lug 219. Axle dropouts 230a and 230b can be installed on each rear structural elements 203a and 203b at the intersection of the chain stay and seat stay to facilitate installation of a rear wheel to the frame 201. In certain embodiments, reinforcing pieces can be utilized to enhance the structural integrity of the frame.

Figure 2:
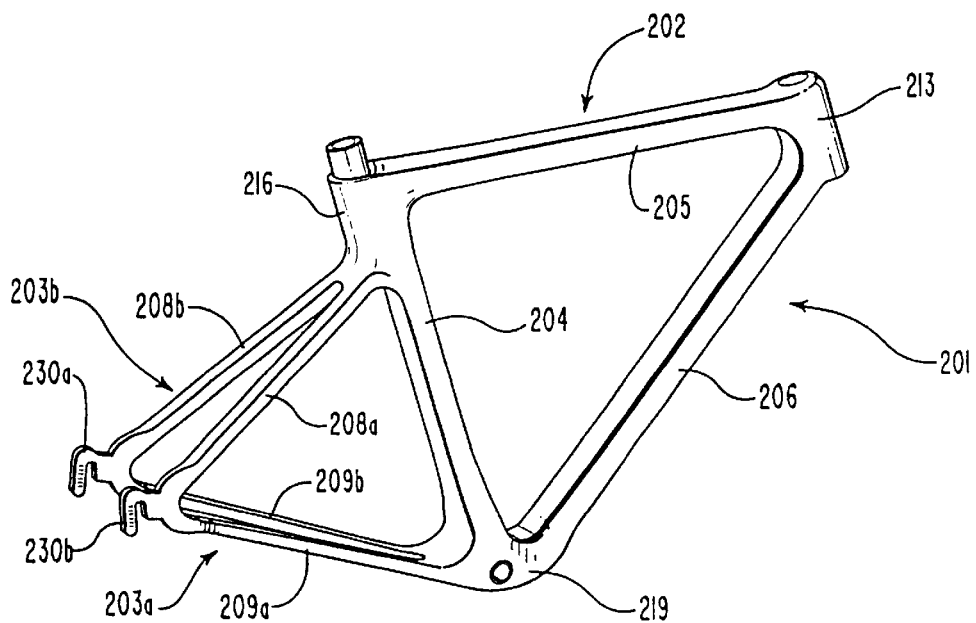
FIG. 2 depicts an embodiment of an assembled bicycle frame.

Referring to FIG. 2, the components of FIG. 1 can be seen assembled into a bicycle frame 201. The head set 213 is installed at the foremost corner 207b (the corner where the top beam 205 and the down beam 206 meet) of the front structural element 202.

The head tube cap 212 is installed over the head tube 211 and onto the front structural element 202. Referring to FIG. 1, in one embodiment, the head tube cap 212 has mounting protrusions 212a, 212b, 212c and 212d for mounting against the sides of the front structural element 202; the combination of mounted head tube 211 and head tube cap 212 forming the head lug 213.

Mounted against the front structural element seat beam 204 is the seat tube 214. The seat tube 214 is mounted to the front structural element seat beam 204 just above the rear structural element mounting protrusions 220a and 220b. A seat tube cap 215 is installed over the seat tube 214 and onto the front structural element tube 205 and seat tube 204 so that the mounting protrusions 215a, 215b, 215c and 215d mount to the sides of the front structural element 202, resulting in a seat lug 216 on the bicycle frame 201.

At the bottom of the bicycle frame 201, a bottom bracket lug 219 is formed by mounting a bottom bracket shell 217 and a bottom bracket cap 218 to the front structural element 202 at the junction of the front structural element seat beam 204 and the down tube 206, and to the rear structural elements 203a and 203b at the junction of the rear structural element mounting protrusions 220c and 220d. The bottom bracket cap 218 typically has a plurality of mounting protrusions 218a, 218b, 218c, 218d, 218e and 218f for mounting against the sides of the various structural elements.

Figure 3:
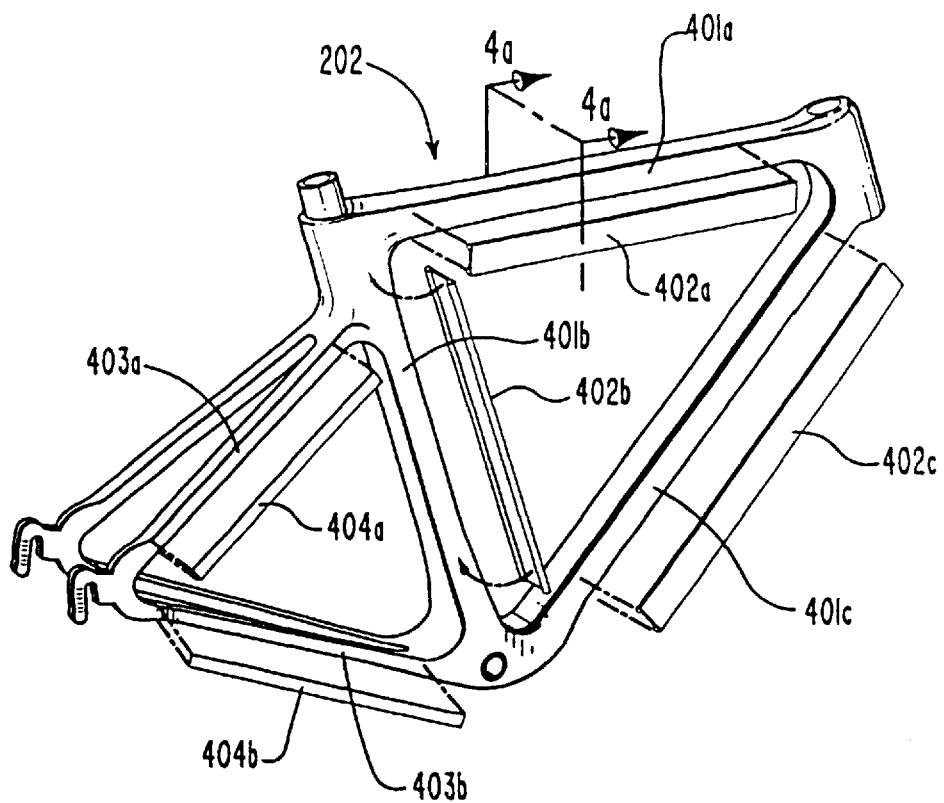
FIG. 3 depicts an embodiment of a bicycle frame with reinforcing side members shown in explosion.

Referring to FIG. 3, an alternative embodiment of a bicycle frame 201 with front structural element 202 is shown. Side reinforcing members 402a, 402b and 402c can be attached to the beams at one or more channels or receptacles 401a, 401b and 401c. The channels or receptacles can be formed, for example, by using a router. The side reinforcing members 402a, 402b and 402c can be installed in the channels to provide a bicycle frame with enhanced structural integrity and durability.

Channels or tracks can also be formed on the bicycle frame 201 to accommodate installation of cables, such as gear shift and brake cables, therein or to accommodate the installation of other components in the channel or track. A cover, such as a side reinforcing member 402a, 402b and/or 402c, can be installed over the channels or tracks for cosmetic appeal and/or for the structural reinforcement provided by the cover. In one embodiment, the channel(s) is routed from a foam layer positioned between two filament wound composite layers of the front structural element 202 (e.g., top beam 205, seat beam 204, and/or down beam 206). Reinforcing side members can be provided, resulting in a foam-filled rectangular beam. Referring to FIG. 3, the rear structural elements 403a and 403b also can be reinforced with side reinforcing members 404a and 404b. For example, each rear structural element 403a and 403b can have a side reinforcing member on each of its left and right side. Alternatively, a rear structural element can have only one side reinforcing member. In one embodiment, the reinforcing side members can be epoxied into their respective channels, although other installation and/or fastening techniques can be used. Further, although FIG. 3 depicts multiple straight, elongate reinforcing side members, other configurations of reinforcing side members are possible. The configuration of a reinforcing side member can match the shape of a portion of a structural element. For example, three-sided reinforcing side members with rounded corners can be used to reinforce the front structural element 202. Additionally, reinforcing side members with various cross sectional shapes and other physical configurations can be used.

Figure 4A:
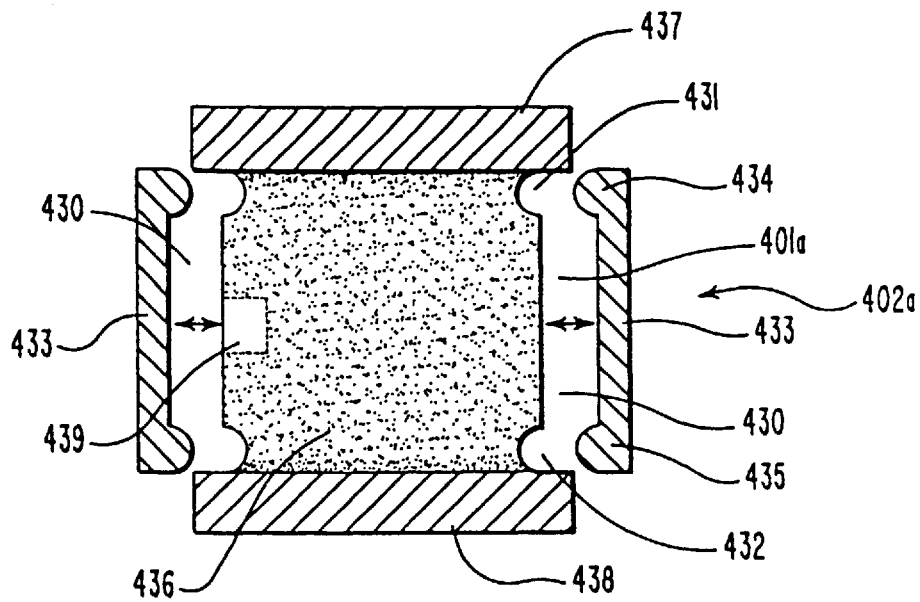
FIG. 4a depicts a cross section of a top beam of the bicycle frame of FIG. 3 taken at 4a—4a, depicting a section of structural foam disposed between two sections of filament wound composite and reinforcing side members, with a cable channel shown in phantom.

Referring to FIG. 4a, a cross sectional view of a portion of a structural element at 4a—4a of FIG. 3 is shown. FIG. 4a shows the channel 401a into which reinforcing side member 402a is installed. Channel 401a can include, for example, a main channel 430 which has been formed (e.g. by routing) to a first depth, and two secondary channels 431 and 432, each formed (e.g., by routing) to a second depth, where the second depth is greater than the first depth. The side reinforcing member 402a which can be installed into the channel 401a includes a main reinforcing member body 433 which is substantially flat on both sides and which is of a first thickness. The side reinforcing member 402a can also have two protruding nubs 434 and 435 sized and shaped to fit into the secondary channels 431 and 432.

The interior of the structural element can include a structural foam reinforcing layer 436. The structural foam reinforcing layer 436 can be positioned between two filament wound composite layers 437 and 438. In one embodiment, the channel 401a, including the main channel 430 and the secondary channels 431 and 432, can be formed in the foam layer 436 so as to not disturb the structural integrity of the composite layers 437 and 438. In another embodiment, the main channel and/or the secondary channels 431 and 432 can be partially or completely formed in the composite layers 437 and/or 438. As an option, a cable channel 439 can be formed in the foam layer 436 (shown in phantom). The cable channel 439 can be used to install a cable, such as gear shift cable, brake cable and/or other cable or components, within the interior of a structural element to maintain an attractive exterior of the bicycle frame and/or to enhance durability of the assembled bicycle by protecting the cable.

Figure 4B:
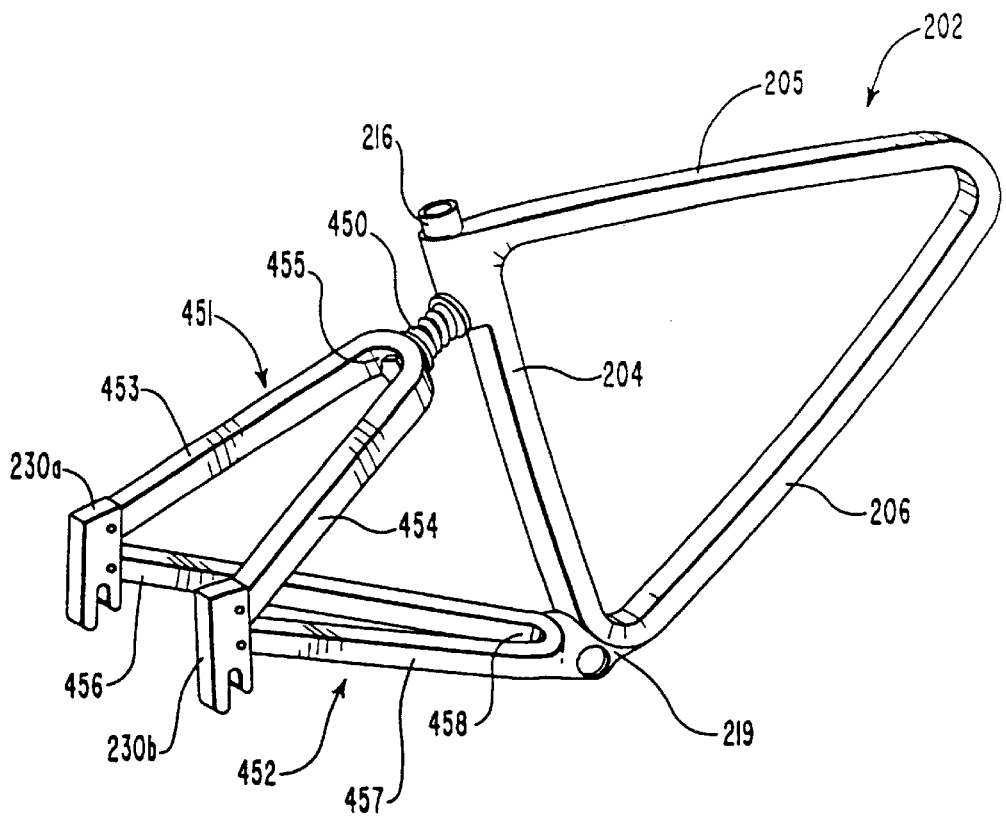
FIG. 4b depicts a perspective view of another embodiment of a bicycle frame.
Figure 4C:
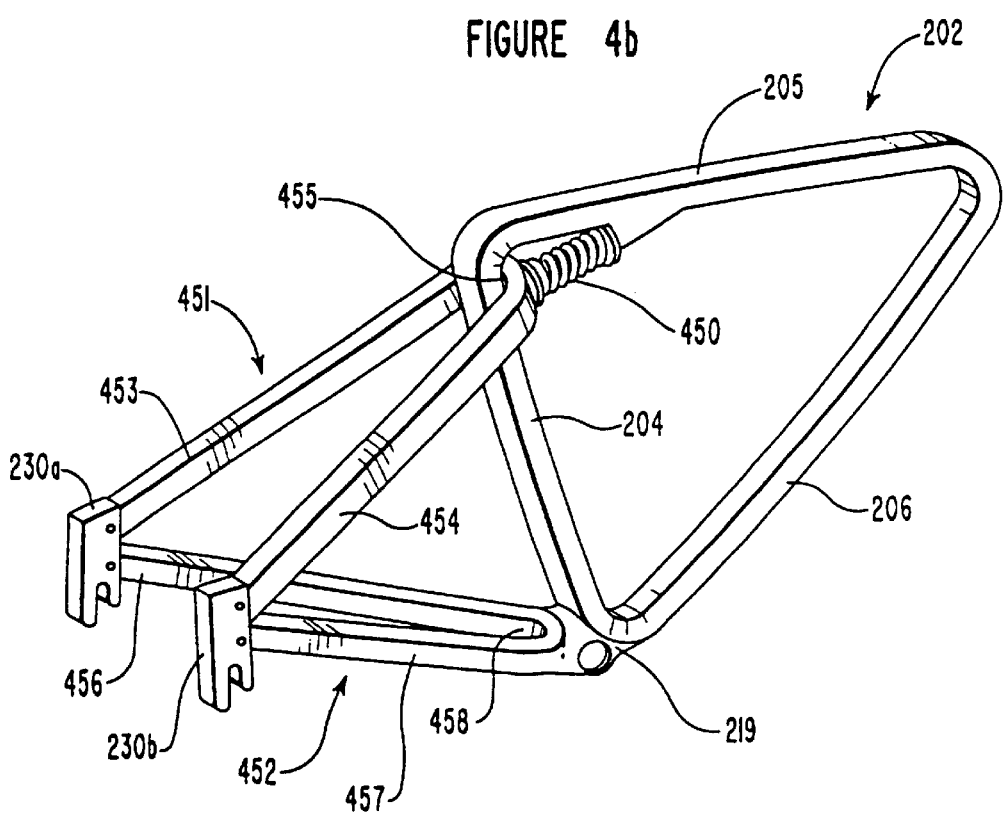
FIG. 4c depicts a perspective view of another embodiment of a bicycle frame.

Referring to FIGS. 4b and 4c, two alternative frames are depicted. Each includes a front structural element 202 and a pair of rear structural elements 451 and 452.

The rear structural elements are oriented so that they each form a generally v-shaped component, one installed above the other, with the upper rear structural element 451 installed at a greater angle to the top beam 205 than the lower rear structural element 452. The upper rear structural element 451 includes a left seat stay beam 453 extending from a drop out 230a to a mounting portion 455 and a right seat stay beam 454 extending from a drop out 230b to the mounting portion 455. The mounting portion 455 can be connected to the rear face of the seat beam 204 by suitable attachment means (e.g., as adhesive, bolting, and the like), and/or by a shock absorber or spring apparatus 450. Alternatively, referring to FIG. 4c, the mounting portion 455 is shown on the front face of the seat beam 204 and is either affixed thereto by known attachment means (e.g., using adhesive, bolts, and the like). The mounting portion can be affixed to either the seat beam 204 or the top beam 205 by a shock absorber or spring apparatus 450. The lower rear structural element 452 includes a left chain stay beam 456 extending from a drop out 230a to a mounting portion 458, and a right chain stay beam 457 extending from a drop out 230b to the mounting portion 458. The mounting portion 458 is typically affixed to the bottom bracket lug 219 or to the seat beam 204.

In the various embodiments, the structural elements of the frame can be manufactured using, for example, graphite epoxy and ROHACELL® foam (trade name for foam that is generically referred to as "polyimide"). The embodiments depicted in FIGS. 2 and 3 can be frames for road bicycles. The embodiments in FIGS. 4b and 4c can be frames for mountain bicycles. In other embodiments, bicycle frames which vary from those shown in the figures can be constructed, and frames or structural elements for other articles can be manufactured. The invented structural elements and frames or other structures made from them can have use in a variety of fields, including use for bicycles, tandem bicycles, multi-wheeled vehicles, all terrain vehicles, automotive, trucking, railway, aircraft, other transportation, building and construction, sporting goods, furniture, and the like.

Bicycle Forks

Figure 18:
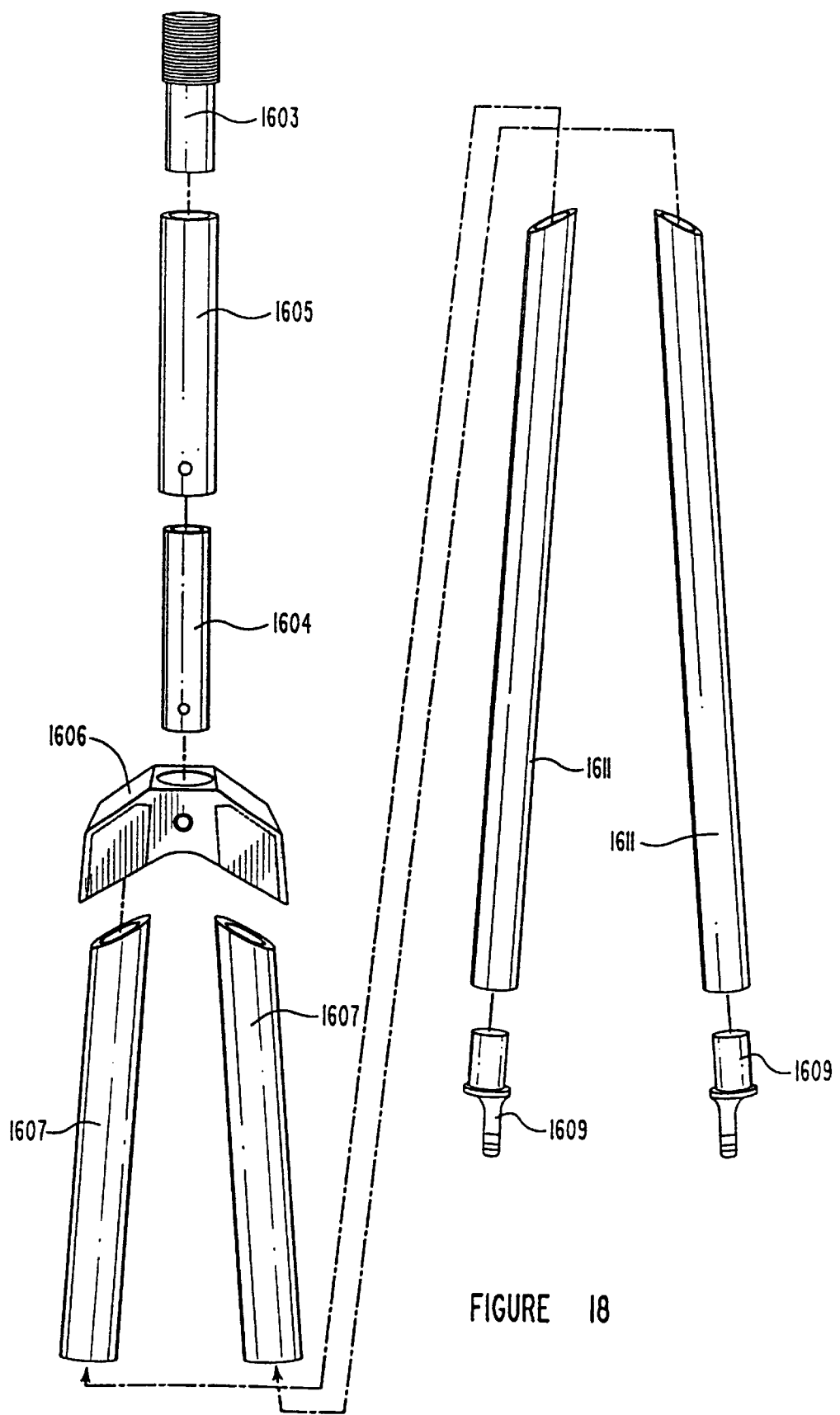
FIG. 18 is a parts explosion front view of an embodiment of a bicycle fork.

Referring to FIGS. 16–18, exemplary embodiments of composite bicycle fork are depicted. The bicycle fork 1601 can include a steer tube 1602 installed into a receptacle on the top of a crown 1606, two fork legs 1608 installed into receptacles on the bottom of the crown 1606, and front wheel drop outs 1609 on the bottom of each fork leg 1608. Steer tube 1602 includes an upper insert section 1603, a main steer tube 1605, and reinforcing sleeve 1604. The upper insert section 1603 can be made from 4130 steel or other suitable metals or composites. The main steer tube 1605 can be a composite component manufactured by filament winding or other suitable material, such as aluminum, steel, carbon composite, and the like. The reinforcing sleeve 1604 can be installed within the main steer tube 1605 to serve a structure reinforcing function.

The crown 1606 depicted can be machined, milled, cast or forged from aluminum, although it also can be made from steel or other metal or from composite materials. The crown 1606 includes a receptacle for the steer tube 1602, two receptacles for the fork legs 1608, and a receptacle or hole 1610 for accommodating the mounting of a brake caliper or other suitable component.

Referring to FIGS. 16–18, fork legs 1608 can be made from two or more sections of composite material. Typically, a fork leg 1608 has an upper fork half leg 1607 and a lower fork half leg 1611, with a tapering occurring along their length from the crown 1606 to the wheel drop out 1609. In alternative embodiments, no tapering is provided. The upper fork half leg 1607 can have a hollow passageway or receptacle in its lower end of sufficient size to permit insertion therein of the top end of the lower fork half leg 1611 and to bond it therein. By using an upper fork half leg 1607 of greater diameter and/or greater wall thickness than the lower fork half leg 1611, a fork leg 1608 is achieved which is more flexible near the dropout 1609 than it is near the crown 1606.

In an embodiment, the upper fork half leg 1607 can be tapered on its exterior; its crown end can be of a greater diameter than the lower fork half leg 1611. At the junction of the upper fork half leg 1607 and the lower fork half leg 1611, the upper fork half leg 1607 can be tapered down to approximately the diameter of the lower fork half leg 1611. Such tapering can be accomplished, for example, by machining such as on a lathe, or other methods such as filament winding the upper fork leg 1607 with the taper already in it. In place of taper, stepping of the half leg can be used.

In alternative embodiments, the fork legs 1608 can be made of a single piece of material, rather than of two joined pieces. Also, the fork legs 1608 can be tapered all along their length, stepped along their length, straight walled, or with walls of varying thickness. Another configuration for the fork legs includes fork legs that utilize three or more sections joined together. Varied flexibility along the fork leg can be achieved with such an arrangement. In such a configuration, an internal fork leg reinforcing sleeve can be provided at the crown end of the fork leg. The fork legs 1608 are usually more flexible near the drop outs 1609 than near the crown 1606 to absorb road shock and vibration.

Figure 15A:
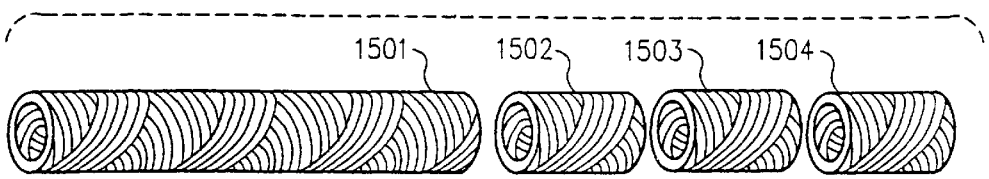
FIG. 15a depicts a section of filament wound tubing component stock and components, such as fork legs, cut therefrom.

The upper fork half leg 1607, the lower fork half leg 1611, the main steer tube section 1605, and the sleeve 1604, are typically manufactured from composite materials. Such composite materials can be formed, for example, by a filament winding process due to the inherent strength and durability possible from a filament wound component. Alternatively, other manufacturing methods mentioned herein can be employed. Referring to FIG. 15a, it can be seen that components of a fork leg can be manufactured as a length of component stock 1501 from which individual component lengths 1502, 1503 and 1504 can be cut.

In some embodiments, the upper fork half leg 1607 and the lower fork half leg 1611 can be bonded together using an aerospace grade 2 part epoxy adhesive, although other joining techniques are possible. Other parts that are joined include fork legs 1608 into crown 1606 receptacles, fork legs 1608 with the drop outs 1609, and steer tube 1602 into the crown 1605 receptacle.

Referring to FIG. 17, a side view of the assembled bicycle fork is depicted. A vertical axis V is depicted, and it can be seen that the fork legs have a forward angle φ with respect to the vertical axis V. This angle can vary, depending on bicycle dimensions and intended use. In one embodiment, the angle φ is 6.25 degrees.

Figure 19:
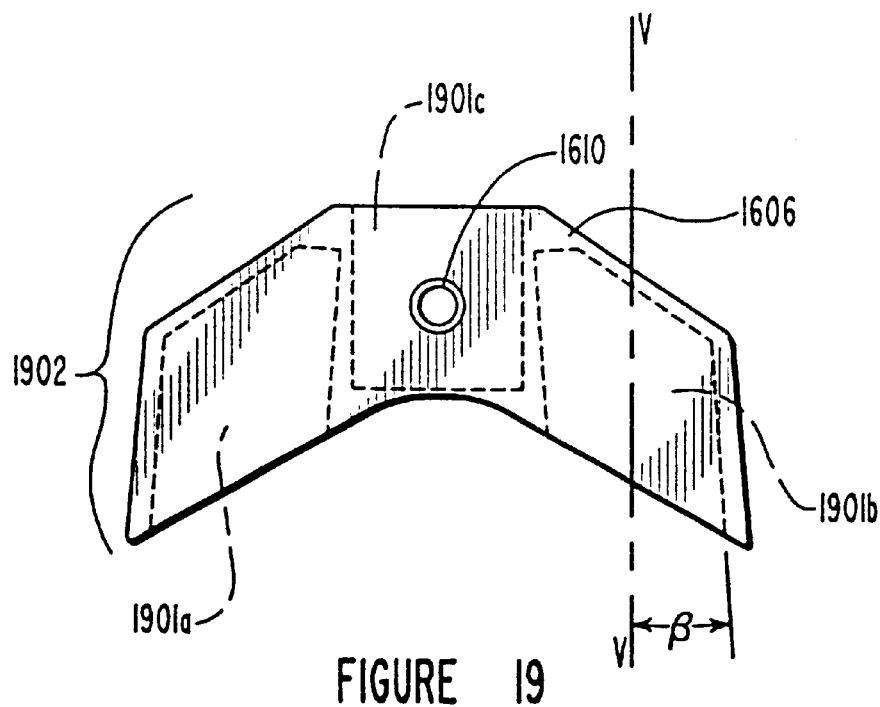
FIG. 19 is a front view of a bicycle fork crown with steer tube receptacle and fork leg receptacles shown in phantom.

Referring to FIG. 19, a front view of the bicycle fork crown 1606 is depicted. The body portion 1902 of the crown 1606 can be seen into which two fork leg receptacles 1901a and 1901b are formed on a first or bottom side of the body portion 1902. A steer tube receptacle 1901c can be formed on a second or top side of the body portion 1902, the second side being opposite the first side. Also visible is a brake caliper mounting receptacle or hole 1610. It can be seen that the fork leg receptacles 1901a and 1901b can be formed at an outward angle 13 relative to the vertical axis V in order to form a space between the fork legs into which a bicycle wheel can be installed. The outward angle β can be about 4.38 degrees, although the amount of angle can vary in different embodiments. The crown is typically manufactured from 7075-T6 aluminum, although it can be manufactured from other materials as well.

Figure 20:
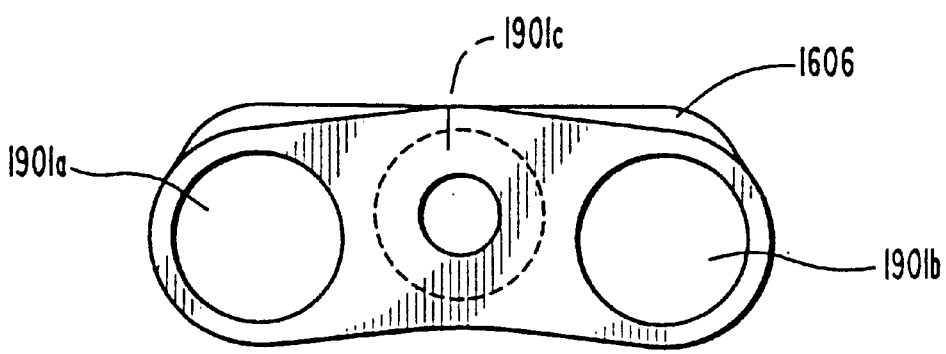
FIG. 20 is a bottom view of an embodiment of a bicycle fork crown with fork leg receptacles shown and with steer tube receptacle shown in phantom.

FIG. 20 is a bottom view of the bicycle fork crown 1606. The fork leg receptacles 1901a and 1901b are visible along with the steer tube receptacle 1901c (shown in phantom). FIG. 21 is a left side view of the bicycle fork crown 1606. The left fork leg receptacle 1901b is shown in phantom.

FIG. 22a is a side view of the bicycle front wheel drop out 1609. The drop out 1609 includes an upper body portion 2204 and a lower body portion 2203. The upper body portion 2204 typically inserts into a fork leg 1608 for mounting thereon. A cavity 2202 can be provided to reduce the weight of the drop out 1609. The lower body portion 2203 includes a generally vertical slot 2201 into which a bicycle axle can be installed.

Figure 23A:
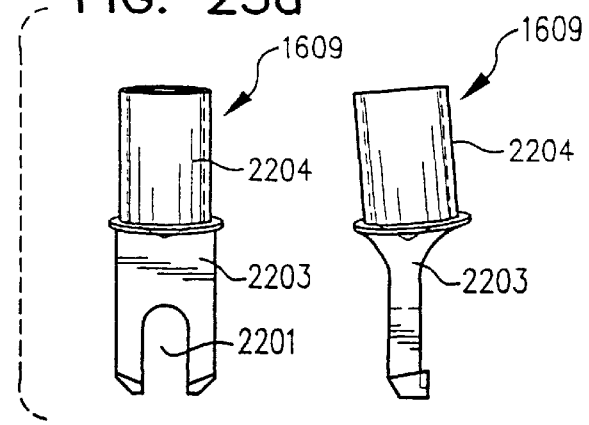
FIGS. 23a–c depict alternative embodiments of wheel drop outs.
Figure 23B:
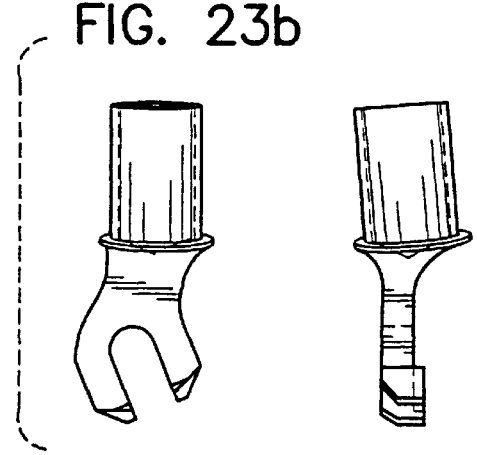
Figure 23C:
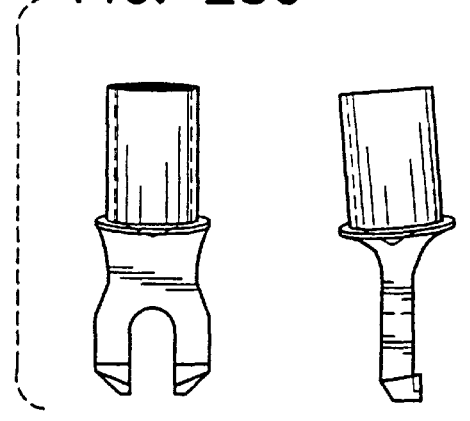

FIG. 22b is a front view of the bicycle front wheel drop out 1609. The upper body portion 2204, lower body portion 2203 and the cavity 2202 can be seen. Also visible is a protruding rim 2305 against which a fork leg 1608 can abut when installed over the drop out 1609. It should be noted that the upper body portion 2204 can be at an angle β to the vertical axis V to compensate for the same amount of angle β of the leg receptacle 1901b in the crown 1606. FIGS. 23a–c depict additional embodiments of wheel drop outs.

Figure 24A:
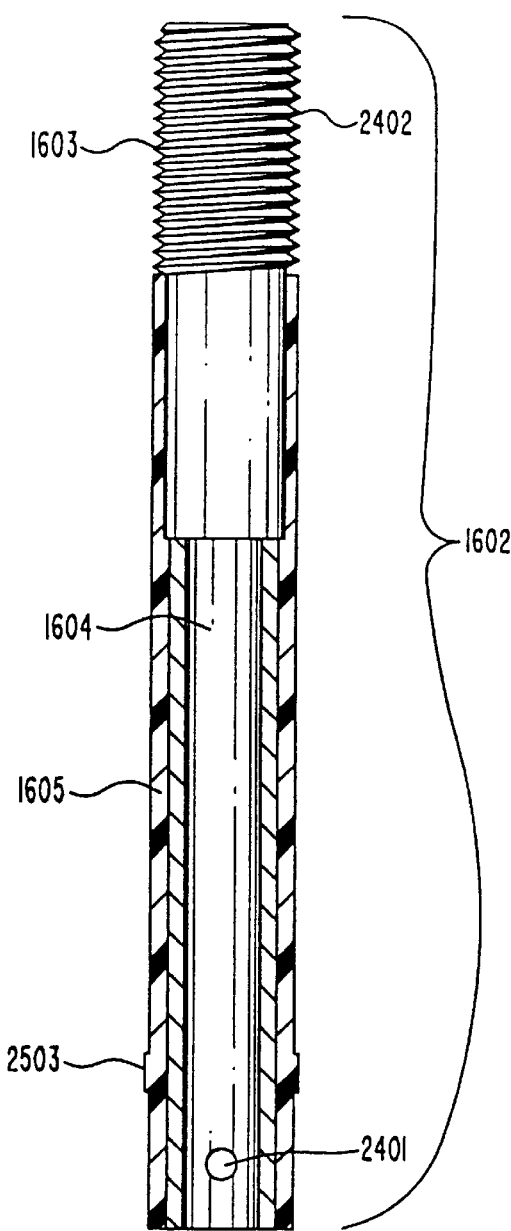
FIG. 24a is a front view of an embodiment of an assembled steer tube, with main steer tube section, upper insert section, and reinforcing sleeve depicted.
Figure 24B:
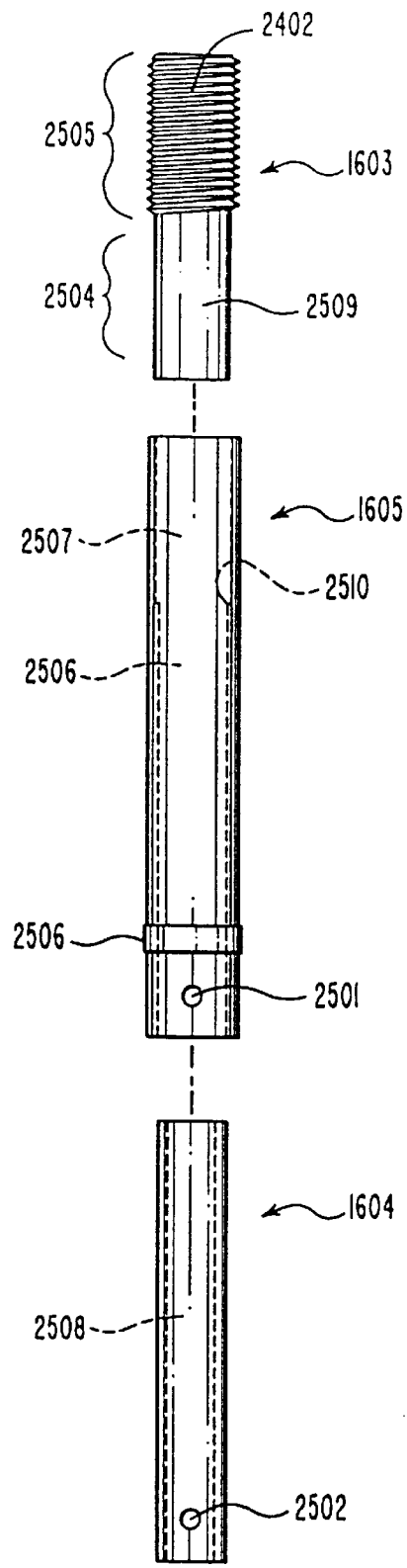
FIG. 24b is a front view parts explosion of a steer tube, with main steer tube section, upper insert section and reinforcing sleeve depicted.

FIG. 24a is a front view of an embodiment of the steer tube 1602. FIG. 24b is a front parts explosion view of the same embodiment. The steer tube 1602 includes an upper insert section 1603 which is installed in an first passageway 2507 of the main steer tube 1605. The lower section 2509 of the upper insert section 1603 inserts into the first passageway 2507. The upper section 2505 of the upper insert section 1603 remains protruding from the main steer tube 1605. The upper section 2505 of the upper insert section 1603 can optionally include threads 2402 for attachment to another component.

The main steer tube 1605 also includes a second passageway 2506. The second passageway 2506 typically has a smaller diameter than the first passageway 2507, the juncture of the first passageway 2507 and the second passageway 2506 forming a ridge 2510 against which the upper insert portion 1603 can abut when installed.

Figure 25A:
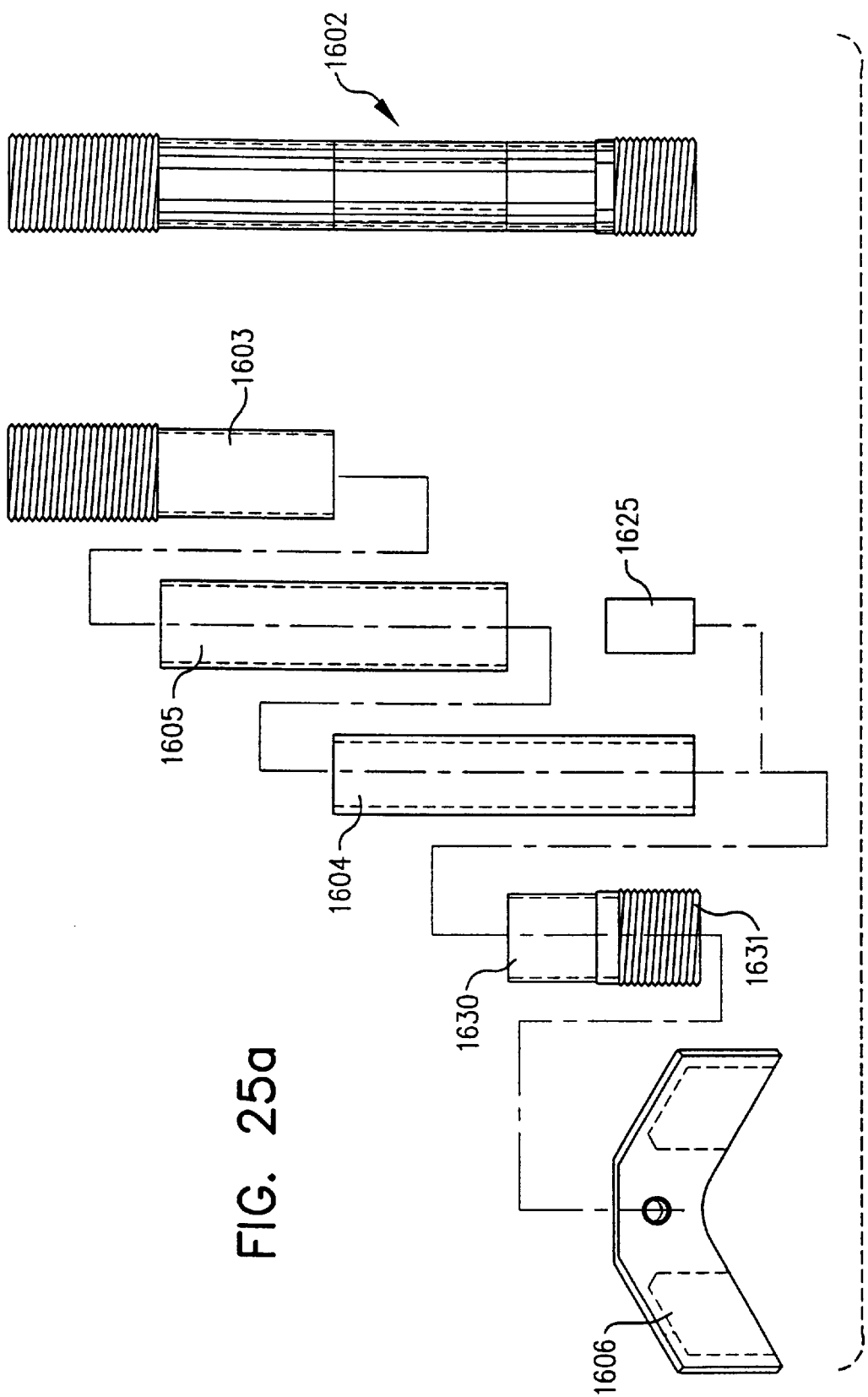
FIG. 25a is a front view parts explosion of another embodiment of a steer tube.

FIG. 25a depicts an alternate embodiment of a steer tube, in which a second passageway 2506 is the same diameter as first passageway 2507, and the upper section of reinforcing sleeve 1604 abuts the lower end of upper insert section 1603. The reinforcing sleeve 1604 can be installed into the second passageway 2506 so that it abuts the installed upper insert section 1603. The reinforcing sleeve 1604 can be used to add strength and stiffness to the steer tube 1602. The sleeve 1604 typically has an internal passageway 2508 to eliminate excess material and to keep it light. The steer tube also includes a lower insert 1630, which abuts an end of the reinforcing sleeve 1604. Lower insert 1630 can have threads 1631 for connection to crown 1606.

The main steer tube 1605 optionally further includes a protruding rib 2503 about its exterior intended to abut against the crown 1606 when installed into the steer tube receptacle 1901c. The protruding rib 2503 can be formed integrally with main steer tube 1605 or can be bonded to main steer tube 1605. In the latter embodiment, protruding rib 2503 can comprise any rigid material, such as aluminum, steel or fiber composites.

Protruding rib 2503 can also have external threads for engagement of corresponding threads in crown receptacle 1901c.

The ends of the upper insert section 1603 and/or reinforcing sleeve 1604 optionally can be threaded to facilitate attachment to another component, such as, for example, a crown 1606, a handlebar, and the like. In certain embodiments, the lower end of reinforcing sleeve 1604 can include a plug 1625 for reinforcement. The plug can comprise any suitable reinforcing material including, but not limited to, delrin.

The assembled steer tube 1602 optionally includes a hole 2401 which is formed by the alignment of hole 2501 of the main steer tube 1605 and the hole 2502 of the reinforcing sleeve 1604. The hole 2401 can be used, for example, for insertion of a bolt for anchoring of the front brake caliper. Holes 2501 and 2502 can be formed, for example, by drilling after assembly of main steer tube 1605, reinforcing sleeve 1604 and crown 1606 using hole 1610 as a guide.

The main steer tube 1605 and the sleeve 1604 can be formed from, for example, composite materials, such as by a filament winding process, from carbon composite, aluminum, steel, and the like. The upper insert section 1603 can be made from similar materials.

Figure 25B:
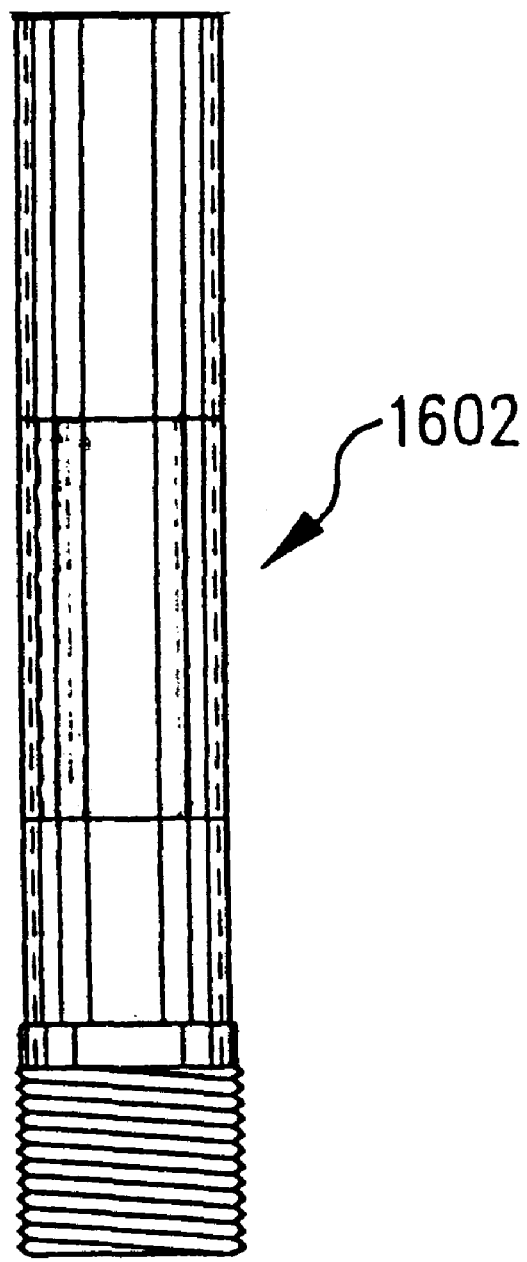
FIG. 25b is a front view parts explosion of another embodiment of a steer tube.

Referring to FIG. 25b, another embodiment of an assembled steer tube 1602 is depicted. The main steer tube 1605 can be made from aluminum, carbon composite, and the like. The main steer tube 1605 optionally can be threaded at one or both ends for attachment to other components, such as, for example, a crown 1606, handlebars, and the like. Alternatively, one or both ends of main steer tube 1605 can be threadless. A rib 2503 can be included to abut against the crown 1606. The rib 2503 can be integrally formed with main steer tube 1605 or can be formed as a separate piece which is attached to the main steer tube 1605. For example, the rib 2503 can be a steel rib attached to a main steer tube 1605 formed of carbon composite. A reinforcing sleeve 1604 can be used to strengthen the main steer tube 1605. The reinforcing sleeve 1604 can extend only a portion of the length of main steer tube 1605 or can extend to meet an upper insert 1603. The reinforcing sleeve 1604 can be made of, for example, aluminum, steel, and the like. In certain embodiments, an aluminum reinforcing sleeve 1604 is used with a carbon composite main steer tube 1605. In other embodiments, a steel reinforcing sleeve 1604 can be used to reinforce an end of an aluminum main steer tube 1605. Similarly, an upper insert section 1603 can be made of steel, aluminum, composite, and the like to reinforce an upper end of the main steer tube.

Figures 26, 27, 28:
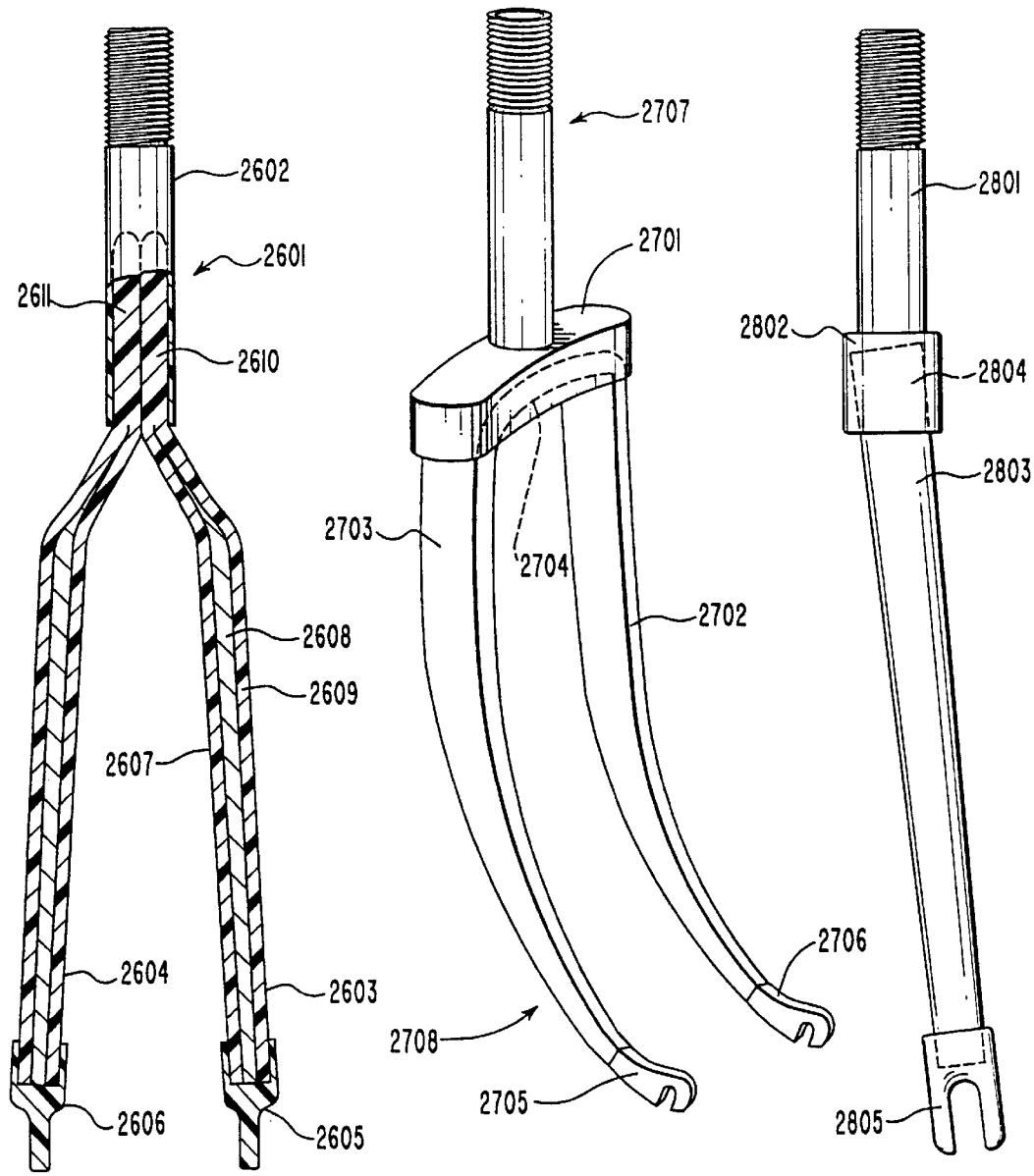
FIG. 26 is a front view of an embodiment of a front fork.
FIG. 27 is a perspective view of another embodiment fork.
FIG. 28 is a side view of another embodiment of a fork.

Referring to FIG. 26, an alternative embodiment of bicycle fork is depicted. The fork 2601 includes a novel steer tube 2602 because it has fork legs 2603 and 2604 mounted directly in it, without the need for a traditional crown. Drop outs 2605 and 2606 can be attached to the fork legs 2603 and 2604. FIG. 26 is a front view cut-away so that the interior structure of the fork 2601 can be observed. Each fork leg 2603 and 2604 includes a first thickness of a resin matrix and reinforcing fiber 2607, a second thickness of structural foam 2608, and a third thickness of resin matrix and reinforcing fiber 2609. The fork legs can be manufactured via the process described below. The fork legs 2603 and 2604 terminate in an installation protrusions 2610 and 2611 each of which can be installed into the steer tube 2602 to form a complete fork 2601.

Figure 11A:
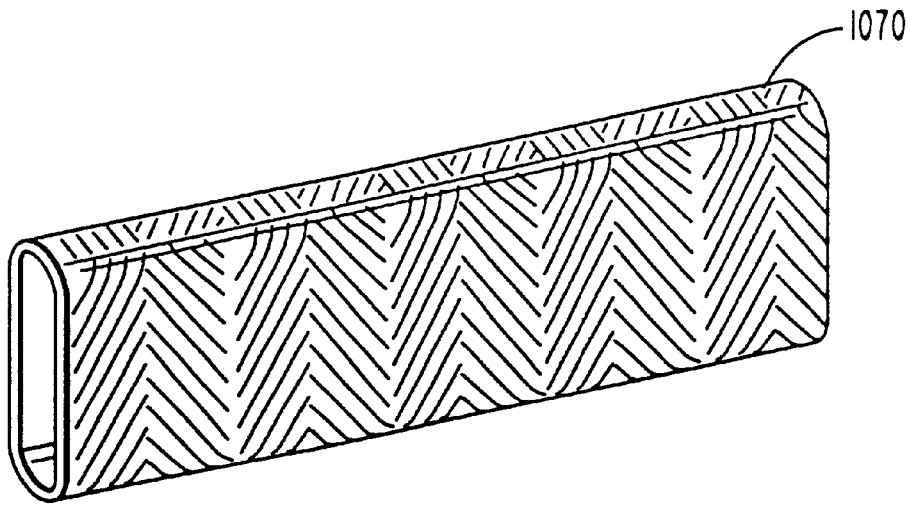
FIG. 11a depicts a perspective view of structural element stock that can be used to manufacture bicycle forks.
Figure 11B:
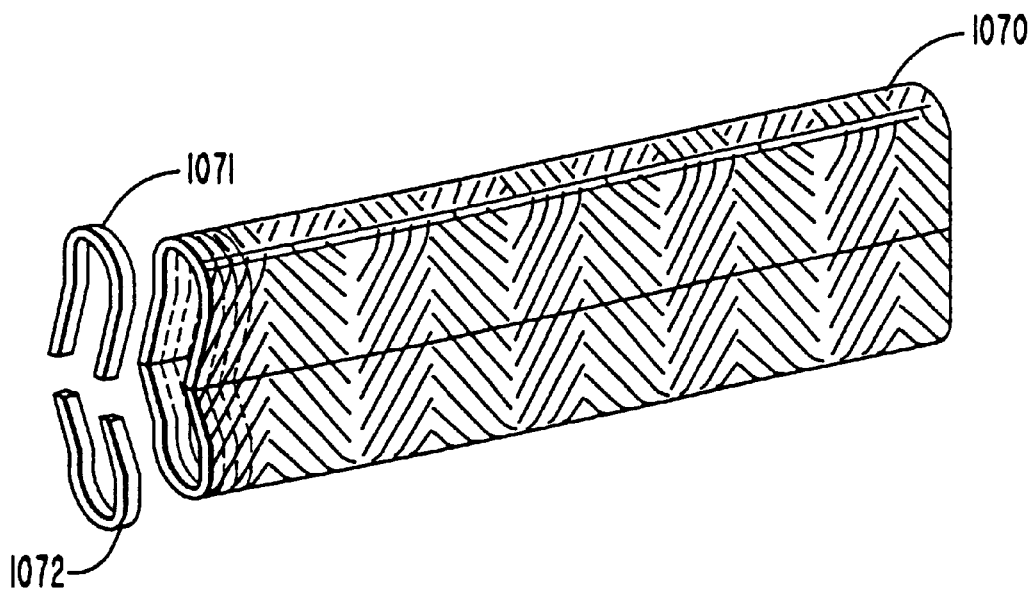
FIG. 11b depicts cutting bicycle fork components from a piece of structural component stock.

Referring to FIG. 27, a perspective view of another bicycle fork is shown. The fork 2707 includes a unitary fork leg member 2708 that has a left fork leg 2702 extending from a drop out 2706 to a central mounting portion 2704, and from the central mounting portion 2704 along a right fork leg 2703 to a drop out 2705. Thus, the fork leg unit 2708 is continuous from drop out to drop out and is affixed to the crown 2701 by central mounting portion 2704 by any adequate mounting means, such as bonding, the use of fasteners, and the like. Fork 2707 can have a similar construction to that described for FIG. 26, for example, that includes a layer of structural foam between two layers of composite material. The foam can be included to achieve desired rigidity at a low weight. In alternative embodiments, the structural foam can be omitted. This fork can be manufactured, for example, as shown in FIGS. 11*a* and 11*b*.

Referring to FIG. 28, a side view of a bicycle fork 2801 is shown. The fork 2801 includes drop out 2805, crown 2802, crown mounting receptacle 2804 and leg member 2803. This figure represents a side view of the fork that can result from manufacturing the fork of FIG. 27 with straight legs, but with the fork leg unit 2708 installed in the crown 2701 at a forward angle. This figure also represents a side view of the fork that would result from manufacturing the fork of FIG. 26 absent the installation protrusions 2610 and 2611 and instead joining the fork legs 2603 and 2604 into a crown. Generally, in any of these embodiments, the forks exhibit more flexibility near the wheels than near the crown.

It should be noted that the fork and components thereof according to the present invention, although described with respect to use on a bicycle, also can be used on any two or three wheeled vehicle, including but not limited to motorcycles and all terrain vehicles.

Figure 5:
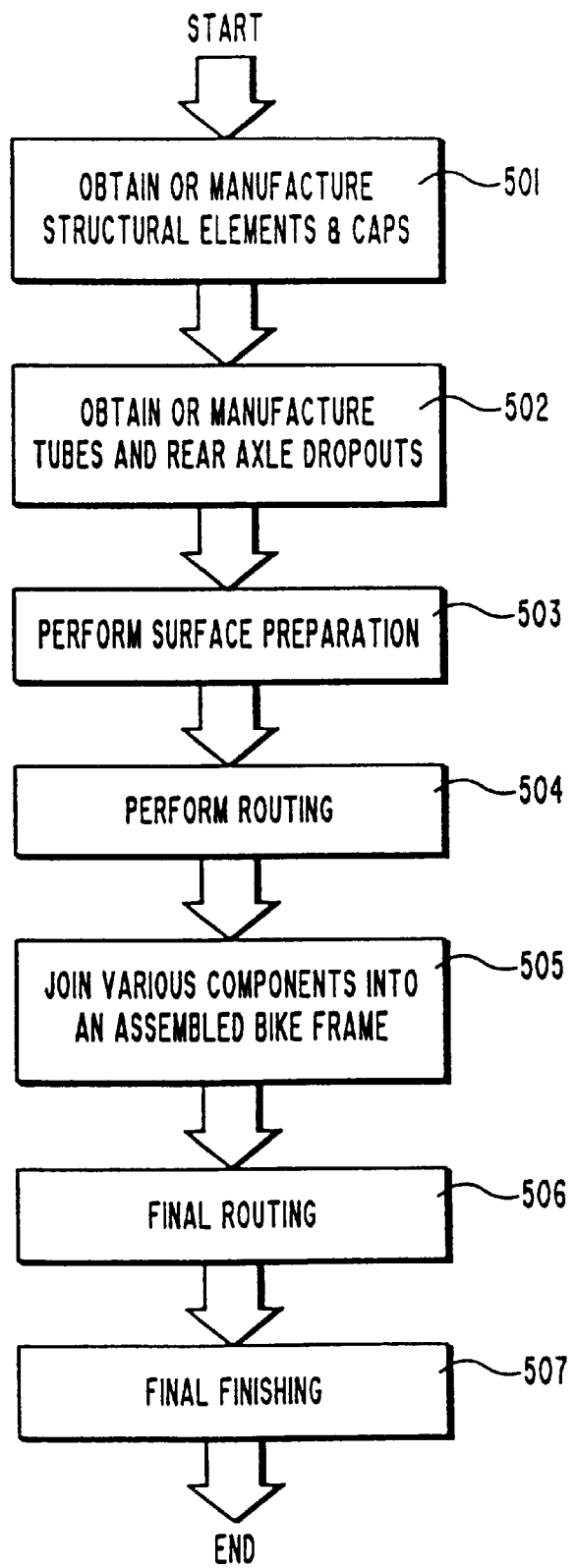
FIG. 5 depicts a method for manufacturing bicycle frames according to the present invention.

Net Shape Filament Winding
  Process for Manufacturing a Bicycle Frame
  Referring to FIG. 5, steps of a process for manufacturing a bicycle frame and components are outlined. The steps include obtaining or manufacturing a front and rear structural elements and caps (step 501). The structural elements and caps can be obtained by employing the net shape filament winding process described below. However, other methods can be used to form the structural elements and caps. For example, structural elements can be manufactured by injection molding, roll wrapping, lay-up, braiding and pultrusion. In some embodiments, two rear structural elements are employed, although it is possible to manufacture a bicycle frame with only one rear structural element. Further, the front and rear structural elements can be three-sided elements with rounded corners. Alternatively, a variety of differently shaped structural elements can be used, such as those described herein.

The second step of the invention is to obtain or manufacture the rear axle dropouts, head tube, seat tube and bottom bracket tube (step 502). The rear axle dropouts can be, for example, formed of standard aluminum alloy parts which are milled from plate, cast or forged into the desired shape. The bottom bracket tube can be, for example, standard aluminum tube. The head tube and seat tube can be, for example, filament wound graphite/epoxy composites, although any known tubing (including, but not limited to, metal and composites) can be used. Such tubing typically has a high strength to weight ratio.

Surface preparation of the various components is also performed prior to assembly (step 503). This preparation can include sanding, grinding, filing, and/or filling. In particular, any composite surfaces that are to be bonded are typically cleaned and adequately prepared to ensure full bond strength.

Routing or cutting of channels into the components can also be performed (step 504). For example, as described below in the discussion concerning the embodiment disclosed in FIG. 4*a*, the front and rear structural elements can include a top layer of filament wound composite, a bottom layer of filament wound composite, and a layer of structural foam disposed between them. A channel or track can be cut or routed about the left and right sides of the front structural components to act as a receptacle(s) for the installation of side reinforcing members therein. It is also typical to cut or rout tracks in the various frame components into which gear shift and/or brake cables can be placed at the time of assembly of a completed bicycle.

The various components can then be assembled to form the bicycle frame (step 505). Joining of most parts can be accomplished by adhesively bonding such parts together, such as by the use of common two-part epoxy adhesive (typically following adequate preparation and cleaning of the surfaces to be bonded). Depending on the adhesive utilized, it can be necessary to expose the epoxy to heat to achieve full cure and desired bond strength. It is also possible to assemble the parts by the use of glue, adhesive tape, welding, bolting, riveting, or screwing. In one embodiment, the rear axle drop outs are bonded and reinforced with the use of bolts. In other embodiments, bonded parts can be reinforced with fasteners such as bolts, rivets, screws, pins, clamps or other fasteners. Depending on the application, the manufacturer can join various components using a variety of methods as listed above or otherwise known to the skilled artisan.

Joining the various components into a bicycle frame includes joining the front and rear structural elements. The protrusions of the rear structural elements can be joined to the generally vertical seat beam of the front structural element so that the rear structural elements are spaced apart sufficiently to permit placement of a bicycle wheel between them. This can be done, for example, by cutting or routing an angled edge on the protrusions of the rear structural elements to achieve angled and spaced-apart installation. In various bicycle frame designs, the actual angle of the seat beams from the vertical tends to vary. For purposes of discussion herein, the term "generally vertical" refers to an angle of departure from a vertical line of 45 degrees or less. Similarly, "generally horizontal" refers to an angle of departure from a horizontal line of 45 degrees or less. The head tube and head tube cap are also joined to the front structural element at the intersection of the top beam and the down beam. The seat tube and seat tube cap are joined at the intersection of the top beam and the seat beam and just above the seat stays of the rear structural elements. The rear axle drop outs are joined at the intersections of the chain stay and seat stay on the rear structural elements. The bottom bracket tube and bottom bracket cap are joined at the intersection of the seat beam, down beam, and chain stays.

Subsequently, final routing or shaping of the assembled frame can be performed (step 506). Such routing can include rounding or smoothing any sharp corners or rough edges of the assembled bicycle frame, such as by routing, grinding, filing or sanding. This step can be performed to minimize weight, for aesthetic purposes, and/or to eliminate sharp points or edges that may prove dangerous.

Final finishing of the bike frame can also be performed (step 507). This finishing can include further sanding, grinding, filing, patching and filling as well as the application of paint, varnish and graphics. For example, the frame can be coated with a lustrous clear coat finish to provide a high gloss, high technology look which permits the attractive filament pattern of filament wound parts to be observed. Included in this step can be the attachment of water bottle brackets, cable brackets and derailleur mounting brackets.

In other embodiments, the steps listed herein need not be performed in the exact order listed, and some steps may be intermixed with other steps.

Figure 6:
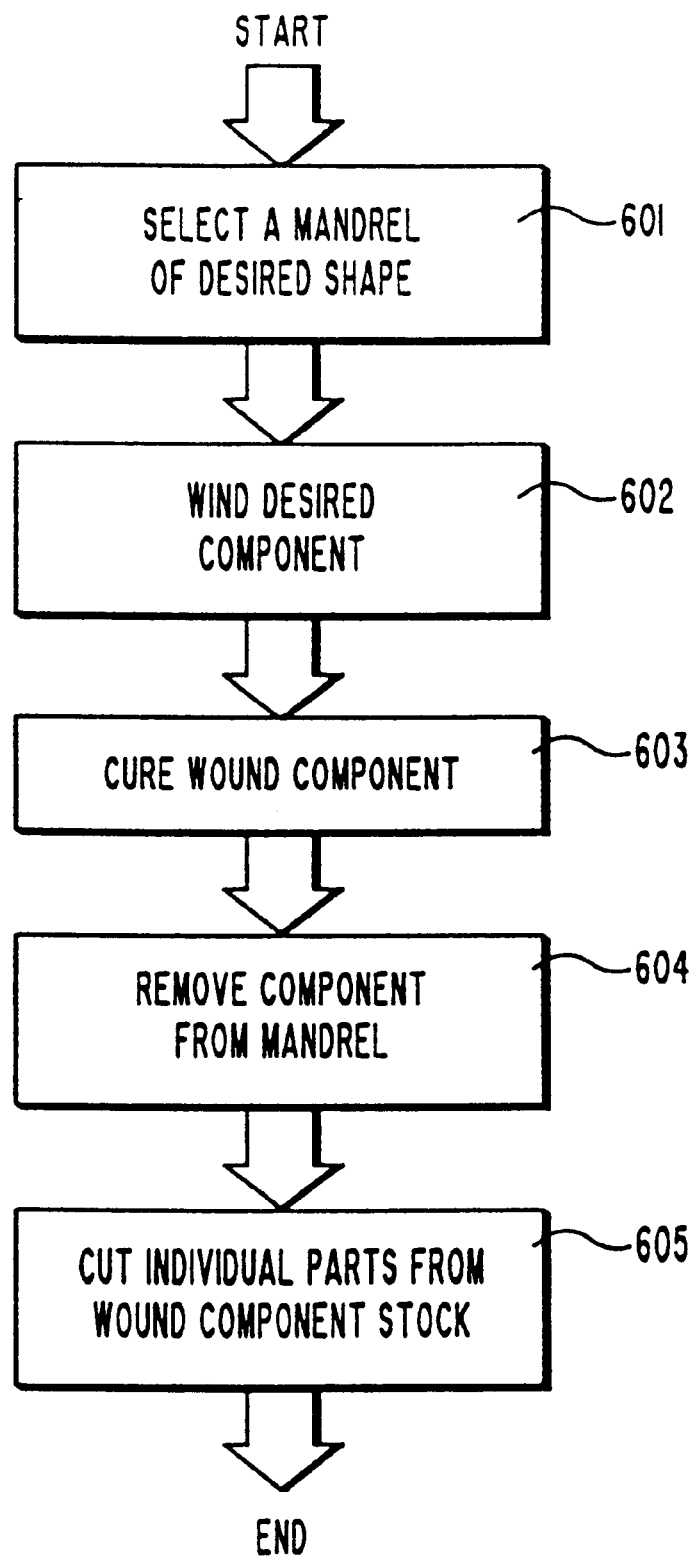
FIG. 6 depicts a method for net shape filament winding.

Generalized Net Shape Filament Winding Process Referring to FIG. 6, basic steps of the invented net shape filament winding manufacturing process are outlined. The steps as outlined in FIG. 6, and as described in detail below, illustrative an example of manufacturing a bicycle frame. Some of the steps overlap the steps described with respect to FIG. 5, but in other embodiments, the process can be used for the manufacture of a wide variety of articles, such as furniture, structural members for various transportation applications (e.g., automotive, motorcycles, tractor trailer rigs, and the like.), construction, bicycle components (e.g., bar ends, handle bars, spokes, cranks), fencing, and beams for numerous applications.

Figure 7A:
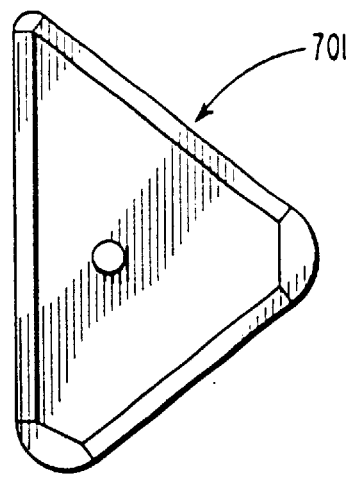
FIG. 7a depicts a side view of a collapsible three-sided mandrel used to manufacture three-sided structural elements.
Figure 7B:
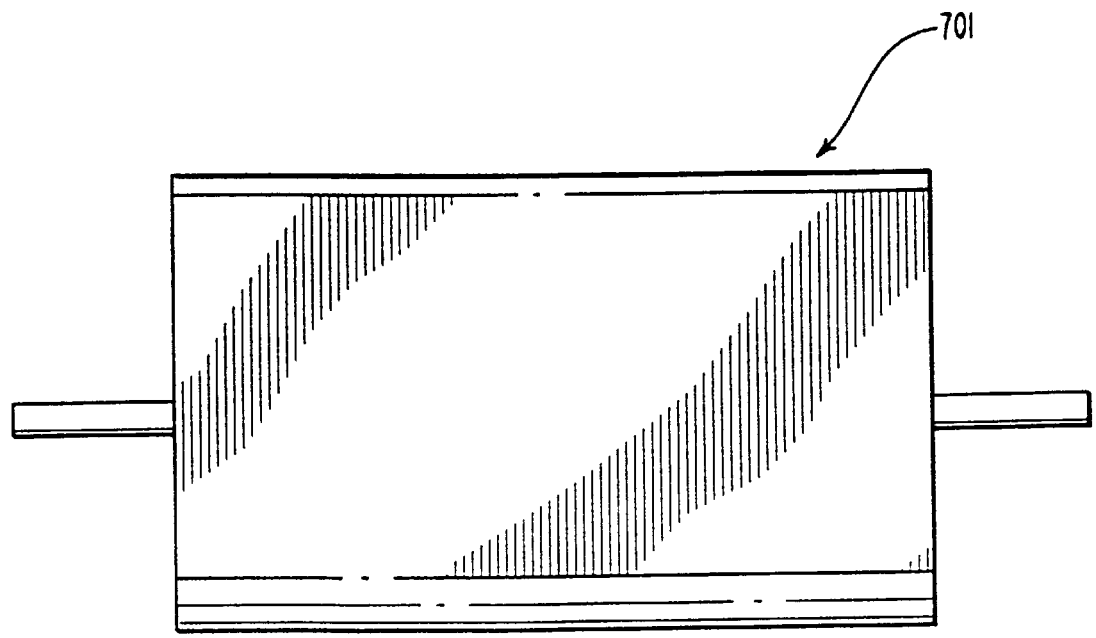
FIG. 7b depicts a front view of a collapsible three-sided mandrel used to manufacture three-sided structural elements.

In FIG. 6, the first step 601 is to select a mandrel of a desired shape for filament winding a quantity of structural element stock or cap stock. For a bicycle frame, as described above and as depicted in the various Figures, the front structural element of the frame can be three-sided with rounded corners. The rear structural elements can be three sided with one of the sides partially removed or cut out. A three-sided mandrel with rounded corners can be used to make such structural components. Referring to FIGS. 7a and 7b, a side view and front view of such a three-sided mandrel 701 is shown, respectively, the mandrel being of the type usable on filament winding machines. The size and geometry of mandrel can vary, depending on the application. Appropriate mandrels can be manufactured from a wide range of materials including, for example, wood, sheet metal, metal plate and rod in various shapes and combinations. The primary function of the mandrel is to provide an internal form to wind the fibers or place the materials on to serve as the basis for the resulting shape following the curing of the wound composite. Of course, the outside dimensions of the mandrel will be the inside dimensions of the wound part. The mandrel typically can be disassembled following curing so that it can be removed from the wound part without damaging it. Such a mandrel is referred to as a "collapsible winding mandrel" due to its ability to be disassembled and collapsed within the wound part. In other embodiments, mandrels of other shapes are used. For example, the bicycle forks depicted in FIGS. 26–28 can be made by selection of a mandrel of the appropriate shape.

Figure 8:
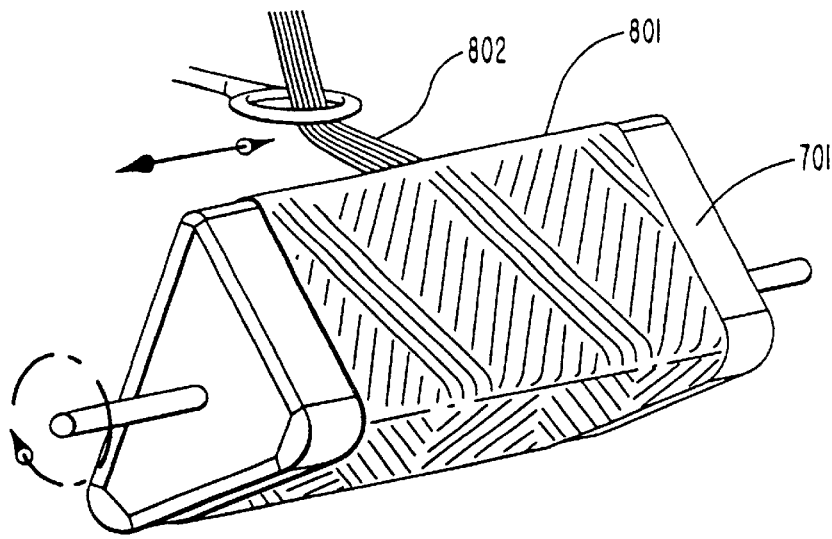
FIG. 8 depicts a perspective view of filament winding a section of structural element stock on a mandrel.

Following selection of a mandrel, filament winding is performed onto the chosen mandrel (step 602). Referring to FIG. 8, it can be seen that the chosen mandrel 701 can be used to wind structural element stock 801 with a typical filament winding machine. As the mandrel 701 rotates, resin-impregnated filament 802 is wound onto the mandrel 701, resulting in the structural element stock 801.

The filament wound structural element stock 801 is then cured (step 603). Typically, this curing is performed with the wound stock still on the mandrel. The required amount of curing can vary according to the materials being used, but generally curing can involve heating and then cooling the wound component over a period of time.

Figure 9:
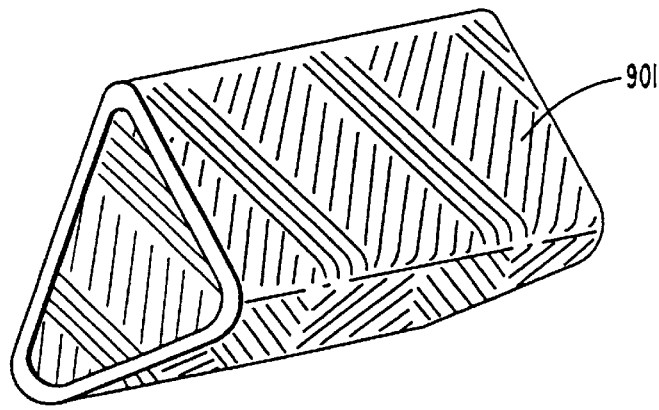
FIG. 9 depicts a perspective view of a cured section of structural element stock that has been removed from the mandrel.

The cured wound stock 801 can then be removed from the mandrel 701. Because a collapsible mandrel can be used in some embodiments, removal of the stock can be performed by disassembling the mandrel 701 and, referring to FIG. 9, removing the mandrel from the structural element stock 901.

Figure 10:
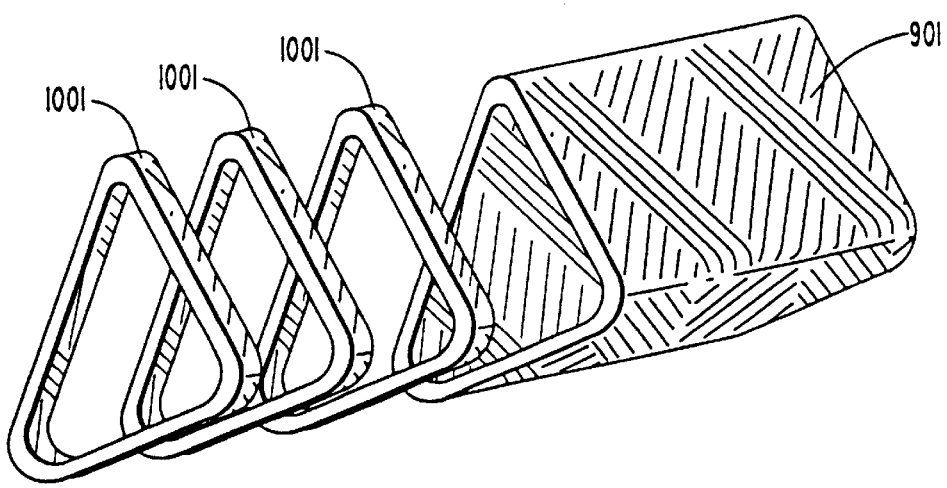
FIG. 10 depicts a perspective view of separated structural element members from a length of structural element stock.

The stock 901 can be cut into individual components. Referring to FIG. 10, three-sided structural elements 1001 for bicycle frames can be formed from the wound component or structural element stock 901. Cutting can be performed by any suitable cutting apparatus, such as, for example, a band saw, disc, circular saw, water jet, and the like. The resulting cut stock can be a plurality of three-sided structural elements that can be readily be assembled in bicycle frames.

The above description illustrates the manufacture of three-sided bicycle frame structural elements. A three-sided mandrel with rounded corners can be used to filament wind three-sided structural element stock, and from that stock, three-sided structural elements can be cut. Alternatively, mandrels of any shape can be used and components of any desired configuration can be cut from them.

Referring now to FIGS. 11–15c, it can be seen that the net shape filament winding process can be employed to manufacture a head tube cap, seat tube cap, bottom bracket cap, steer tube elements and fork legs. Referring to FIGS. 11a and 11b, it can be seen that by proper selection of mandrel shape, the unitary bicycle fork leg unit of FIG. 27 can readily be manufactured in large quantities. Fork leg units 1071 and 1072 can be cut from the fork leg stock 1070 two high, resulting in little or no material waste and a very efficient cutting process. The fork legs of FIGS. 26 and 28 can be similarly manufactured by appropriate selection of mandrel shape and cutting pattern.

Figure 12:
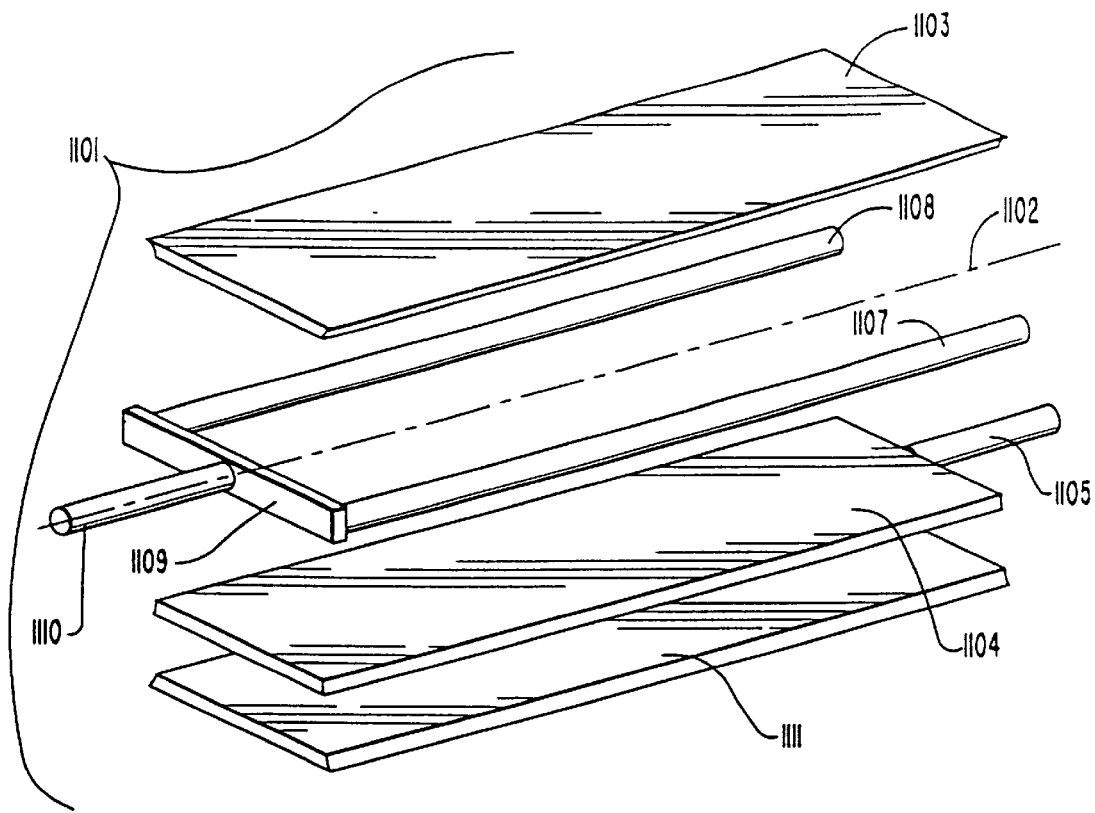
FIG. 12 depicts an exploded view of a collapsible mandrel that can be used to filament wind lengths of cap stock.

In FIG. 12, a collapsible winding mandrel 1101 useful for manufacturing a quantity of cap stock is shown. It can be seen that the mandrel 1101 comprises numerous components that can be readily disassembled. The mandrel 1101 includes a longitudinal axis 1102, a rectangular top plate 1103, a rectangular mid plate 1104 with protrusion 1105 for mounting in a filament winding machine, and two elongate rounded sides 1107 and 1108 attached to an end piece 1109 with protrusion 1110, and a bottom plate 1111. Thus, in three dimensions the mandrel 1101 is generally rectangular in shape with rounded sides on each side of its longitudinal axis, with a flat top and flat bottom.

Figure 13A:
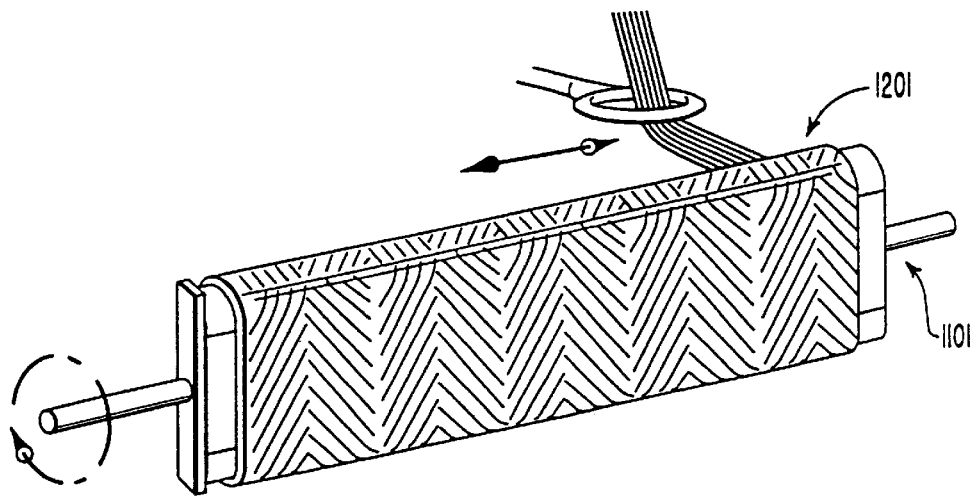
FIG. 13a depicts filament winding of a section of cap stock on the collapsible mandrel of FIG. 12.
Figure 13B:
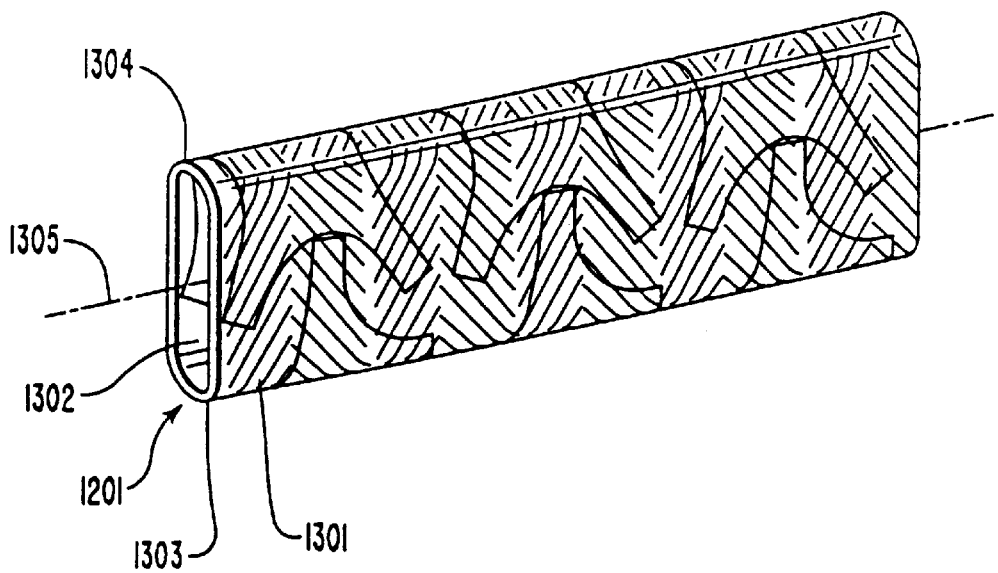
FIG. 13b depicts a section of cured cap stock prior to cutting caps from it, with cap outlines drawn thereon.
Figure 14:
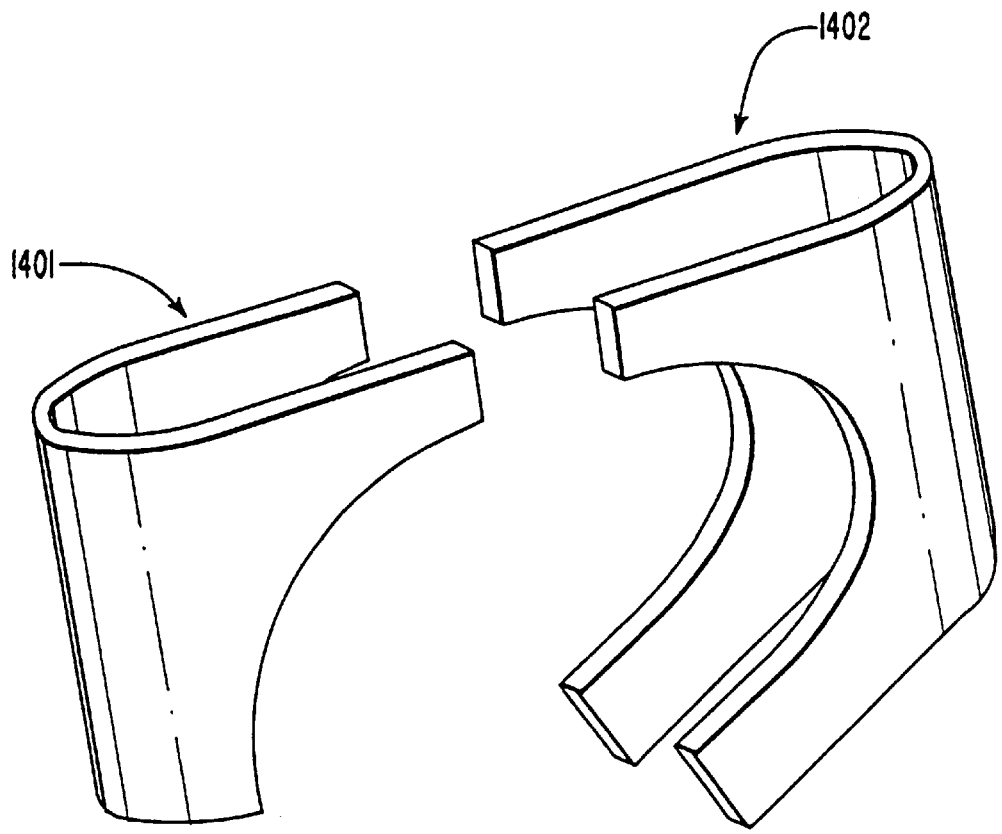
FIG. 14 depicts cap elements that have been cut from a section of cap stock.

Referring to FIG. 13a, the use of the mandrel 1101 to filament wind a quantity of cap stock 1201 can be seen. When filament winding of the cap stock 1201, the cap stock 1201 can be cured by any of a variety of prior art curing techniques. Then the mandrel 1101 is removed from within the cap stock 1201. Referring to FIG. 13b, various cap pieces, such as a head cap and a seat tube cap can be cut from the cap stock 1201. In some embodiments, it can be necessary to trace the desired cap outline on the cap stock 1201, depending on the cutting machinery employed. Referring to FIG. 14, finished and usable cap pieces, such as the seat tube cap 1401 and the head tube cap 1402, are shown. Reinforcing side members of the front and rear structural elements for a bicycle frame similarly can be cut from cap stock. From FIG. 13b, it can be seen that use of mandrel 1101 can produce a cap stock 1201 which is generally rectangular in shape, with a generally flat top section 1301, generally flat bottom section 1302, a rounded first side 1303 parallel to the longitudinal axis 1305 of the cap stock 1201, and a rounded second side 1304 parallel to the longitudinal axis 1305 of the cap stock 1201.

Figure 15B:
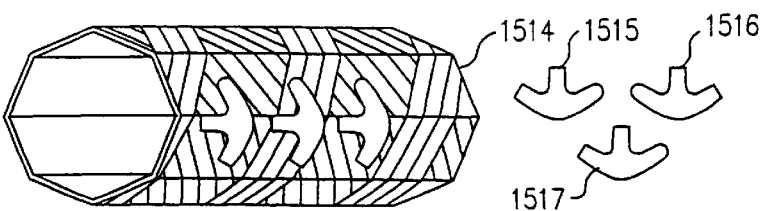
FIG. 15b depicts bottom bracket caps from a section of multi-sided cap stock.
Figure 15C:
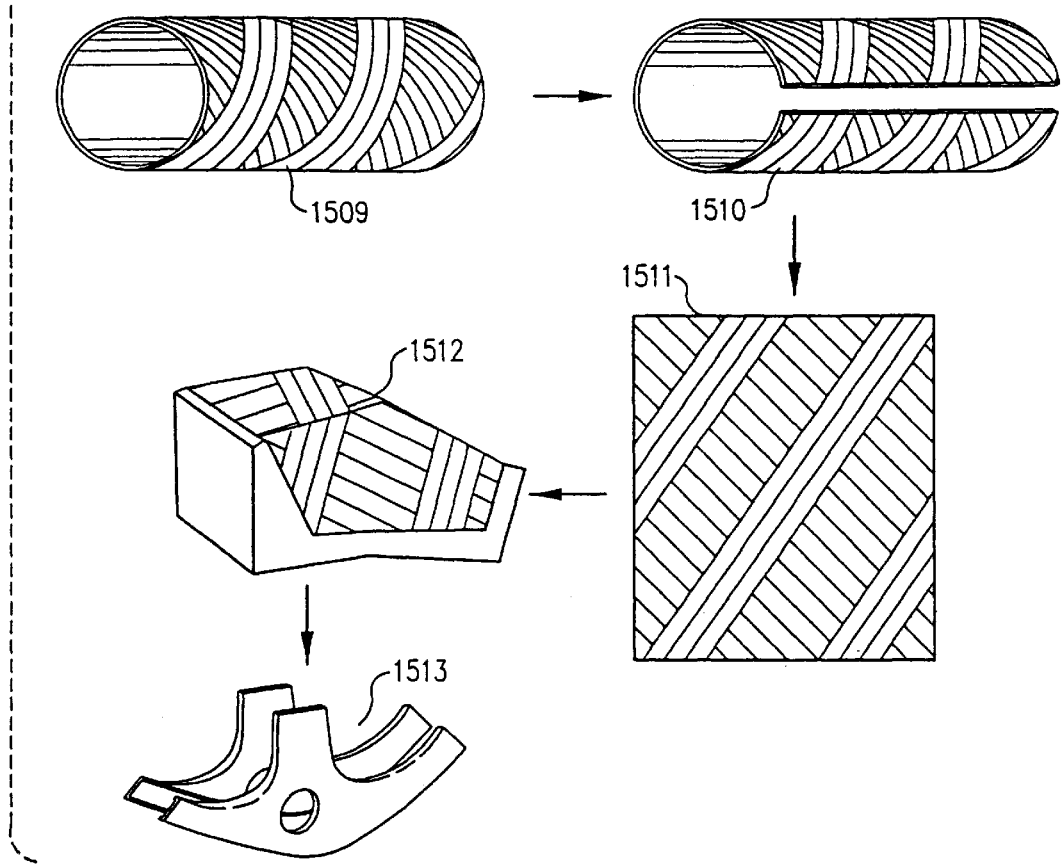
FIG. 15c depicts an example of forming bottom bracket caps from wet cylindrical cap stock.

Referring to FIG. 15a, it can be seen that cylindrical stock 1501, such as cap stock, can be manufactured and various components 1502, 1503 and 1504 can be cut from it. Such components can include, for example, seat tubes, head tubes, steer tubes and fork legs. Referring to FIG. 15b, caps or other components can be cut from filament wound stock wound on multi-sided mandrels. The octagonal cap stock 1514 depicted can be used to supply bottom bracket caps 1515, 1516 and 1517. The bottom bracket caps can be cut from stock of this shape to result in proper angle and orientation of the various protrusions needed to attach the cap to both front and rear structural elements. Referring to FIG. 15c, an alternative embodiment for producing bottom bracket caps is shown. Bottom bracket 1513 can be wound on a cylindrical mandrel, removed from the mandrel wet (uncured) as a piece of uncured cap stock 1509, cut along its length 1510, flattened or unrolled 1511, placed on a male mold of desired configuration 1512 and then cured to result in a bottom bracket cap 1513.

Depending upon the particular application, a wide variety of materials and winding patterns can be used to generate a suitable finished product using the net shape filament winding manufacturing process according to the present invention. The preferred materials used are composite materials. As used herein, "composite materials" refers to a matrix resin and reinforcing fibers or filament. For example, carbon fiber and a heat cured epoxy an be used, although many suitable substitutes are available. For example, for fiber, graphite, carbon, glass (such as E or S glass), KEVLAR (trade name for "aramid fiber"), polyethylene, polyester, NYLON (trade name for "polyamide"), and others, can be used. For matrix resin, epoxy, rubber modified epoxy, urethane, thermoplastic, and mixtures of any of these including mixtures that utilize fibers, and others, can be used.

Additionally, although in the process according to the present invention, the wound component stock material is described as being manufactured using a filament winding process, it is possible to manufacture such stock material from other processes including pultrusion, roll wrapping, lay-up, braiding and injection molding.

In various embodiments, to achieve desired wall thickness and cross sectional area of a particular component, a number of layers of fiber reinforced composite can be wound in place at a desired orientation on a mandrel. Then a section of low density structural foam sheet can be placed onto the layer of wound composite, and more composite wound on top of the structural foam, disposing the foam between top and bottom layers of fiber reinforced filament wound composite. For example, FIG. 4a depicts such a structure and is discussed above. The use of structural foam facilitates building components with desired wall thicknesses without resulting in an unduly expensive part to manufacture or an unduly heavy part. Further, foam can be easily routed or channeled to make a receptacle for installation of side reinforcing members and for making tracks to receive brake and gear shift cables. The foam layer is typically covered with a filament wound reinforcing piece for both aesthetic reasons and for added strength and durability of the finished part.

The structural foam can be installed during filament winding by placing a sheet of foam of the desired dimensions (e.g., length, width and thickness) on top of the initial layer or layers of composite. Subsequent composite can be wound onto the foam, resulting in a wound part that has a layer of structural foam disposed between two layers of filament wound material. Examples of suitable foam for this manufacturing technique include ROHACELL (trade name for foam that is generically referred to as "polyimide"), polyurethane, polyvinylchloride, isocyanurate, polyethylene, syntactic and others. The foam provides significant spacing between the bottom and top surfaces of the composite article to achieve the desired cross sectional dimensions while minimizing total weight. The foam can also provide a solid core (having trapped gas bubbles) which improves impact resistance, durability and vibration dampening. A structural foam that has a high strength to weight ratio can be used over low density core materials.

While the present invention has been described and illustrated in conjunction with a number of specific embodiments, those skilled in the art will appreciate that variations and modifications can be made without departing from the principles of the invention as herein illustrated, described and claimed. The present invention can be embodied in other specific forms without departing from its spirit or essential characteristics. The described embodiments are to be considered in all respects as only illustrative, and not restrictive. The scope of the invention is, thereof, indicated by the appended claims, rather than by the foregoing description. All changes which come within the meaning and range of equivalency of the claims are to be embraced within their scope.

What is claimed is:

1. A fork for a vehicle, the fork comprising:
  (a) a steer tube, the steer tube having:
    (1) an elongate tubular main steer tube section having a first end, a second end, an exterior surface, and an interior passageway, the main steer tube section comprising resin matrix and reinforcing fiber,
    (2) an upper insert having an upper portion and a lower portion, the lower portion being configured for installation into the main steer tube section interior passageway so that the upper portion protrudes from the main steer tube facilitating installation of a component thereon; and
    (3) a reinforcing sleeve, the reinforcing sleeve installed into the main steer tube section interior passageway to reinforce the steer tube, wherein a lower portion of the reinforcing sleeve is threaded;
  (b) a crown, the crown having:
    (1) an upper receptacle configured for installation of the steer tube therein, and
    (2) a lower receptacle configured for installation of at least one leg member therein; and
  (c) a leg member having a first end and a second end, the leg member first end being installable into the lower receptacle, and the leg member second end being adapted for the installation of a wheel drop out thereon.

2. The fork as recited in claim 1, wherein the main steer tube section and the reinforcing sleeve are filament wound components.

3. The fork as recited in claim 1, wherein the leg member comprises a resin matrix and reinforcing fiber.

4. The fork as recited in claim 1, wherein the leg member is a filament wound component.

5. The fork as recited in claim 1, wherein the upper portion of the upper insert is threaded.

6. The fork as recited in claim 1, wherein the leg member comprises:
   (1) an upper half leg having a first upper half leg first end and an upper half leg second end, the upper half leg first end installed into the crown lower receptacle, the upper half leg second end having an opening with an internal diameter for installation of a lower half leg therein, and
   (2) a lower half leg having a lower half leg first end and a lower half leg second end, the lower half leg second end installed into a wheel drop out, the lower half leg first end having an external diameter, the lower half leg first end external diameter being not greater than the upper half leg second end opening internal diameter, the lower half leg first end being installed into the upper half leg second end opening.

7. The fork as recited in claim 6,
wherein the upper half leg is more rigid than the lower half leg, resulting in a leg member that is more rigid in the area of the leg member first end than in the area of the leg member second end.

8. The fork as recited in claim 7,
wherein the upper half leg has a first diameter at the upper half leg first end, and a second diameter at the upper half leg second end; and
wherein the upper half leg is tapered between the upper half leg first end and the upper half leg second end so that the second diameter is smaller than the first diameter.

9. The fork as recited in claim 8, wherein the upper half leg second diameter approximates the lower half leg first end external diameter.

10. The fork as recited in claim 1, wherein the leg member comprises:
    (1) an upper leg having an upper leg first end and an upper leg second end, the upper leg first end installed into the crown lower receptacle, the upper leg second end having an opening with an internal diameter adapted for installation of a mid leg therein;
    (2) a mid half leg having a mid leg first end and a mid leg second end, the mid leg first end having an external diameter, the mid leg first end external diameter being not greater than the upper leg second end opening internal diameter, the mid leg first end installed into the upper leg second end opening, and the mid leg second end having an opening with an internal diameter adapted for installation of a lower leg therein; and
    (3) a lower leg having a lower leg first end and a lower leg second end, the lower leg second end installed into a wheel drop out, the lower leg first end having an external diameter, the lower leg first end external diameter being not greater than the mid leg second end opening internal diameter, the lower leg first end being installable into the mid leg second end opening.

11. The fork as recited in claim 10, wherein the leg member comprises a resin matrix and reinforcing fiber.

12. The fork as recited in claim 10, wherein the leg member is a filament wound component.

\* \* \* \* \*